(12) United States Patent
Hattori et al.

(10) Patent No.: US 8,391,118 B2
(45) Date of Patent: Mar. 5, 2013

(54) INFORMATION PROCESSING APPARATUS, INFORMATION PROCESSING METHOD, AND PROGRAM

(75) Inventors: Shinobu Hattori, Tokyo (JP); Kenjiro Ueda, Kanagawa (JP); Yoshiyuki Kobayashi, Tokyo (JP); Motoki Kato, Kanagawa (JP); Kazuo Yamamoto, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/173,162

(22) Filed: Jun. 30, 2011

(65) Prior Publication Data

US 2012/0008479 A1 Jan. 12, 2012

(30) Foreign Application Priority Data

Jul. 8, 2010 (JP) .............................. P2010-155699

(51) Int. Cl.
*G11B 7/00* (2006.01)
(52) U.S. Cl. ........................................................ 369/84
(58) Field of Classification Search ............... 369/53.22, 369/84, 83, 53.24, 53.16, 53.44, 53.21, 275.3, 369/59.25
See application file for complete search history.

(56) References Cited

U.S. PATENT DOCUMENTS

| 5,610,893 | A | * | 3/1997 | Soga et al. | 369/53.24 |
| 5,729,516 | A | * | 3/1998 | Tozaki et al. | 369/53.21 |
| 5,835,465 | A | * | 11/1998 | Yachida | 369/53.16 |
| 7,403,616 | B2 | * | 7/2008 | Kageyama et al. | 380/201 |
| 8,184,516 | B2 | * | 5/2012 | Kimmelmann et al. | 369/53.44 |

FOREIGN PATENT DOCUMENTS

JP 2008-098765 A 4/2008

* cited by examiner

*Primary Examiner* — Nabil Hindi
(74) *Attorney, Agent, or Firm* — Lerner, David, Littenberg, Krumholz & Mentlik, LLP

(57) ABSTRACT

An information processing apparatus includes a data processing unit which executes a copy process for recording data recorded on a first medium onto a second medium, and the data processing unit executes a questionable data discrimination process for discriminating questionable data which is highly likely to be not normally reproduced in a reproduction process in which a reproduction program different from a dedicated reproduction program to the data recorded on the first medium is applied, and executes at least any of processes, which include a questionable data deletion process for deleting the questionable data from a copy target or a warning notification process for notifying a user of a possibility that copied data will not be normally reproduced, according to the discrimination result in the questionable data discrimination process.

13 Claims, 23 Drawing Sheets

FIG. 2

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| ⋮ | ⋮ | ⋮ |
| TITLE n | CPSn | Kun |

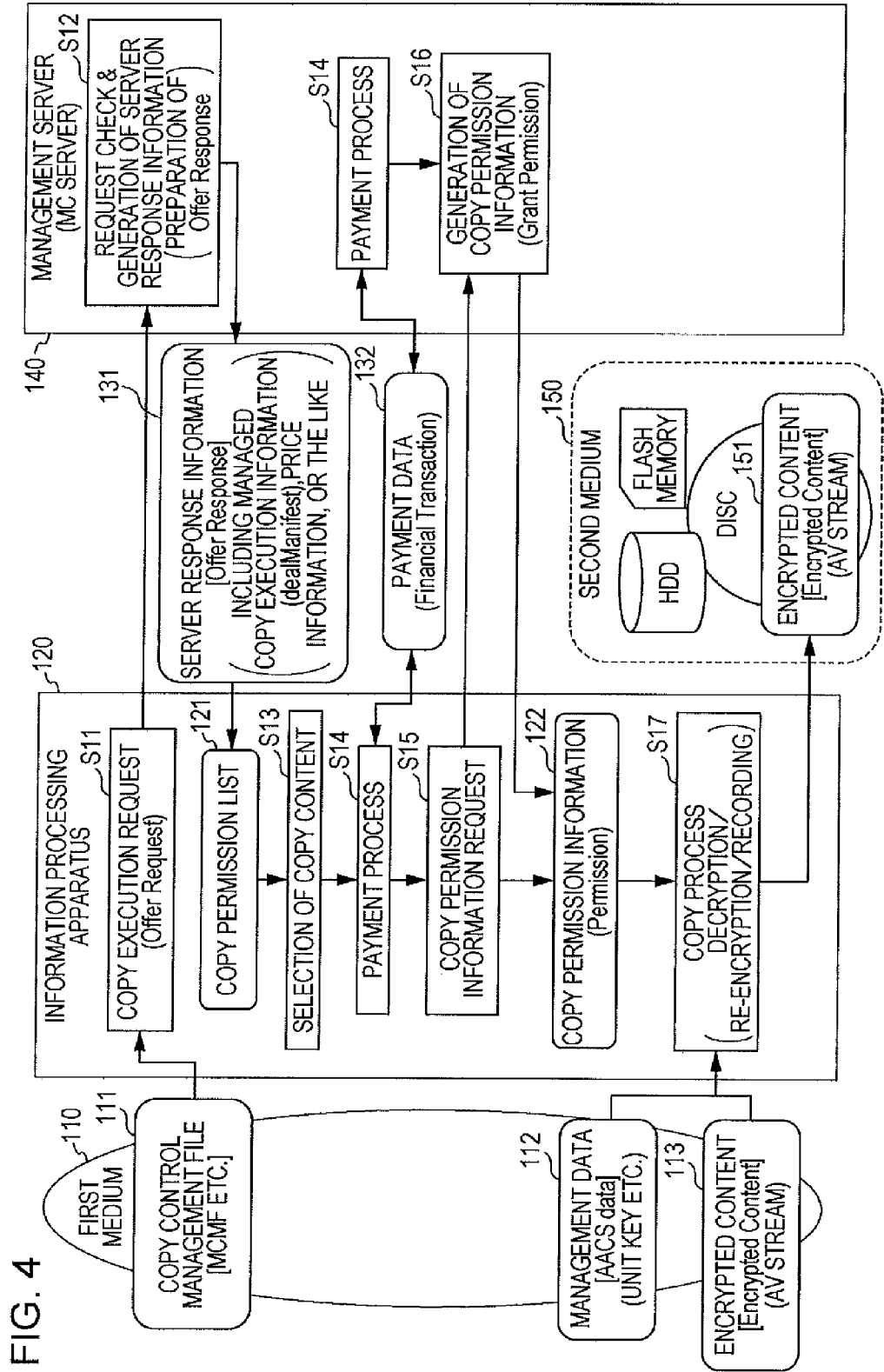

FIG. 5

| ELEMENT (Element) | | NOTE (Note) |
|---|---|---|
| URL OF MANAGEMENT SERVER (URL of MCS) | | URL OF MANAGEMENT SERVER AS ACCESS DESTINATION |
| COPY DATA INFORMATION (File name to be copied) | PLAYLIST FILE NAME (PlayList file name) | PLAYLIST FILE NAME AS COPY TARGET (CLIP CAN BE SPECIFIED BASED ON PLAYLIST) |
| | CPS UNIT KEY INFORMATION (Index to identify the CPS Unit Key) | ENCRYPTION KEY APPLIED TO DECRYPTION PROCESS |
| | COPY UNIT IDENTIFIER (MCUi) | INFORMATION FOR IDENTIFYING COPY UNIT AS MC (Managed Copy) EXECUTION UNIT |
| CONTENT ID (Content ID) | | CONTENT IDENTIFIER |

FIG. 6

| ELEMENT (Element) | NOTE (Note) |
|---|---|
| CONTENT ID (Content ID) | CONTENT IDENTIFIER |
| CONTENT CERTIFICATE ID (Content Certificate ID) | IDENTIFIER OF CONTENT CERTIFICATE |
| MEDIUM IDENTIFIER (Pre-recorded Media Serial Number) | IDENTIFIER UNIQUE TO MEDIUM |
| RANDOM NUMBER (mcmNonce) | DATA FOR VERIFYING DATA AUTHENTICITY |
| LANGUAGE CODE (Language Code) | USED FOR DETERMINING DISPLAY LANGUAGE INCLUDING PRICE LIST OR THE LIKE |

FIG. 7

| ELEMENT (Element) | | | NOTE (Note) |
|---|---|---|---|
| DETAILED OFFER INFORMATION (offer) | TITLE/ABSTRACT/DESCRIPTION (title/abstract/description) | | IDENTIFICATION INFORMATION OF CONTENT PERMITTED FOR COPYING (To identify content by MCS) |
| | COPY UNIT IDENTIFIER (MCUi) | | IDENTIFICATION INFORMATION OF COPY UNIT AS A UNIT OF COPYING (To identify Managed Copy Unit (item for sale)) |
| | PRICE INFORMATION / ADDITIONAL PRICE INFORMATION (price/priceInfo) | | COPY PRICE INFORMATION (priceInfo is a additional information regarding price (e.g. remaining copy count)) |
| | SERIAL NUMBER (serialNumberRequired) | | SERIAL NUMBER SET BY SERVER (To indicate if sticker code input is required or not) |
| | URL OF PAYMENT SERVER (financialHTMLURL) | | ACCESS INFORMATION TO PAYMENT SERVER (URL of financial server (may be different from MCS)) |
| | COPY DESTINATION INFORMATION (mcotInfo) | | INFORMATION OF DEVICE OR MEIDUM AS COPY DESTINATION (Information regarding copy destination) |
| RANDOM NUMBER (mcmNonce) | | | DATA FOR VERIFYING DATA AUTHENTICITY (To compare with mcmNonce which MCM sent) |
| COPY DATA INFORMATION [File name to be copied] (dealManifest) | PLAYLIST FILE NAME (PlayList file name) | | SPECIFIC INFORMATION OF FILE AS COPY PROCESSING TARGET (To identify Clip AV stream(s) and Clip Information) |
| | CPS UNIT KEY INFORMATION (Index to identify the CPS Unit Key) | | KEY INFORMATION FOR CONTENT DECRYPTION (To decrypt Clip AV stream(s)) |
| | COPY UNIT IDENTIFIER (MCUi) | | COPY UNIT IDENTIFICATION INFORMATION AS A UNIT OF COPYING (To identify Managed Copy Unit (item for sale)) |
| SERVER PUBLIC KEY CERTIFICATE (MCScert) | | | PUBLIC KEY CERTIFICATE STORING PUBLIC KEY OF MANAGEMENT SERVER (Including MCS public key) |
| SIGNATURE (signature) | | | DATA FOR VERIFYING DATA AUTHENTICITY (To verify integrity of offer) |

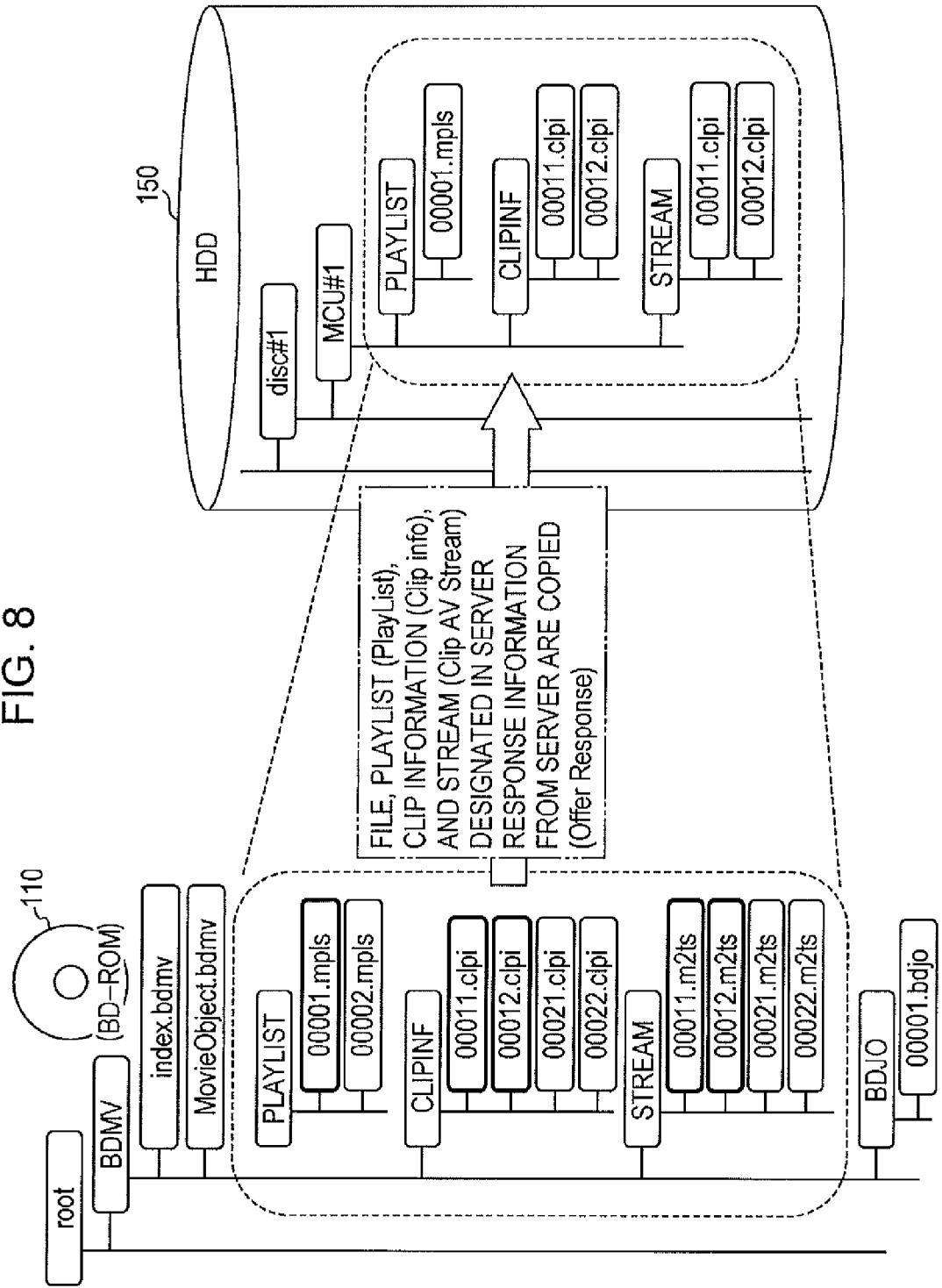

FIG. 11

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0;<br>    PlayItem_id<number_of_PlayItems;<br>    PlayItem_id++) { | | |
|     PlayItem() | | |
|   } | | |
|   for (SubPath_id=0;<br>    SubPath_id<number_of_SubPaths;<br>    SubPath_id++) { | | |
|     SubPlayItem() | | |
|   } | | |
| } | | |

FIG. 12

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for (i=0; i< number_of_SubPlayItems;i ++) { | | |
|     SubPlayItem(i) | | |
|   } | | |
| } | | |

FIG. 13

| SUBPATH TYPE (SubPath_type) | MEANING (Meaning) |
|---|---|
| 0 | RESERVED (reserved) |
| 1 | RESERVED (reserved) |
| 2 | PATH FOR AUDIO APPLIED TO BROWSABLE SLIDE SHOW (Audio presentation path of the Browsable slideshow) |
| 3 | PATH FOR INTERACTIVE APPLICATION (PopUp Menu) |
| 4 | PATH FOR SUBTITLES (Text Subtitle) |
| ... | ... |
| 7 | PATH FOR PICTURE-IN-PICTURE (In-mux PiP) |
| 8 TO 255 | RESERVED (reserved) |

FIG. 14

| APPLICATION TYPE (application_type) | MEANING (Meaning) |
|---|---|
| 0 | RESERVED (reserved) |
| 1 | MOVIE APPLICATION |
| 2 | TIME-BASED SLIDE SHOW (Time based slide show) |
| 3 | MAIN PATH OF BROWSABLE SLIDE SHOW (Main-path of Browsable slide show) |
| 4 | SUBPATH OF BROWSABLE SLIDE SHOW (Sub-path of Browsable slide show) |
| 5 | SUBPATH OF INTERACTIVE GRAPHICS MENU (Sub-path of Interactive graphics menu) |
| 6 | SUBPATH OF TEXT SUBTITLES (Sub-path of Text subtitle) |
| 7 | SUBPATH OF ONE OR MORE ELEMENTARY STREAMS (Sub-path of one or more elementary stream path) |
| 8 TO 255 | RESERVED (reserved) |

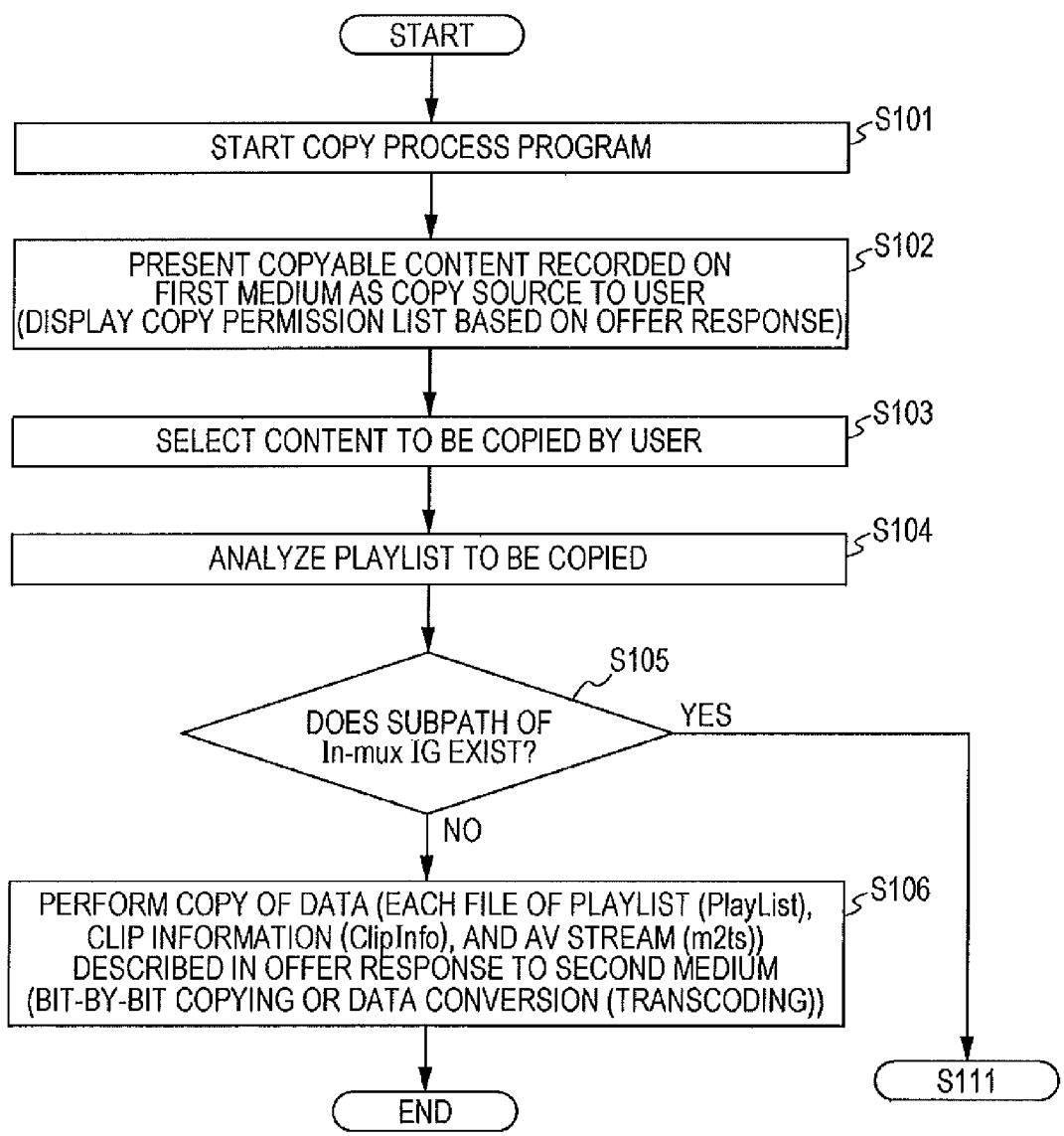

FIG. 20A
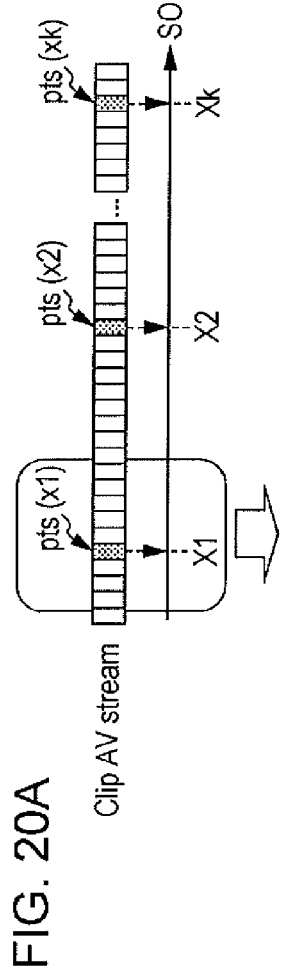
FIG. 20B
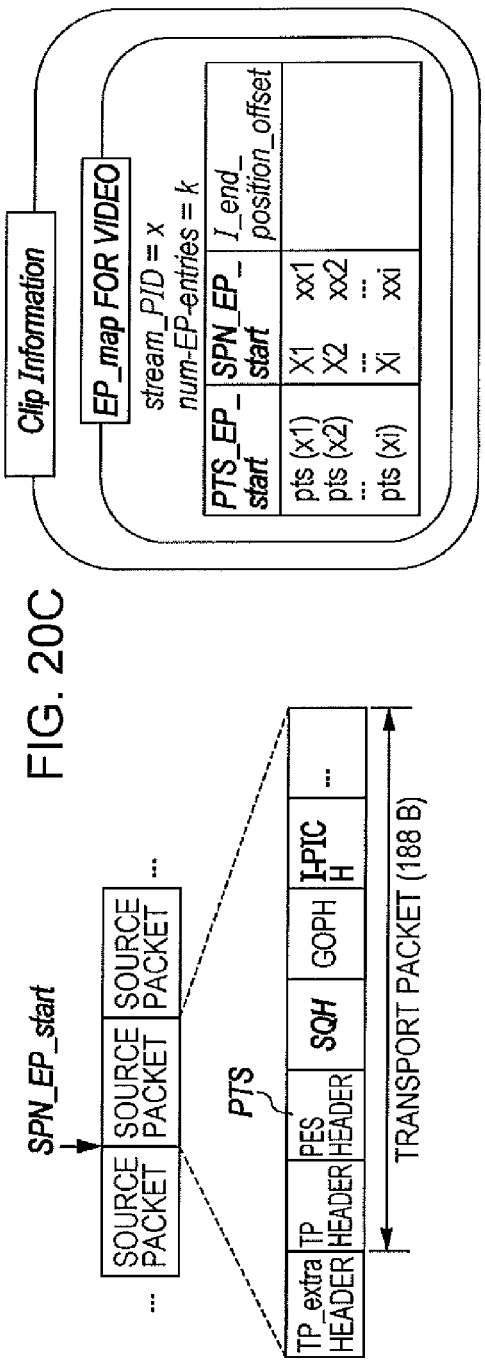
FIG. 20C
FIG. 20D

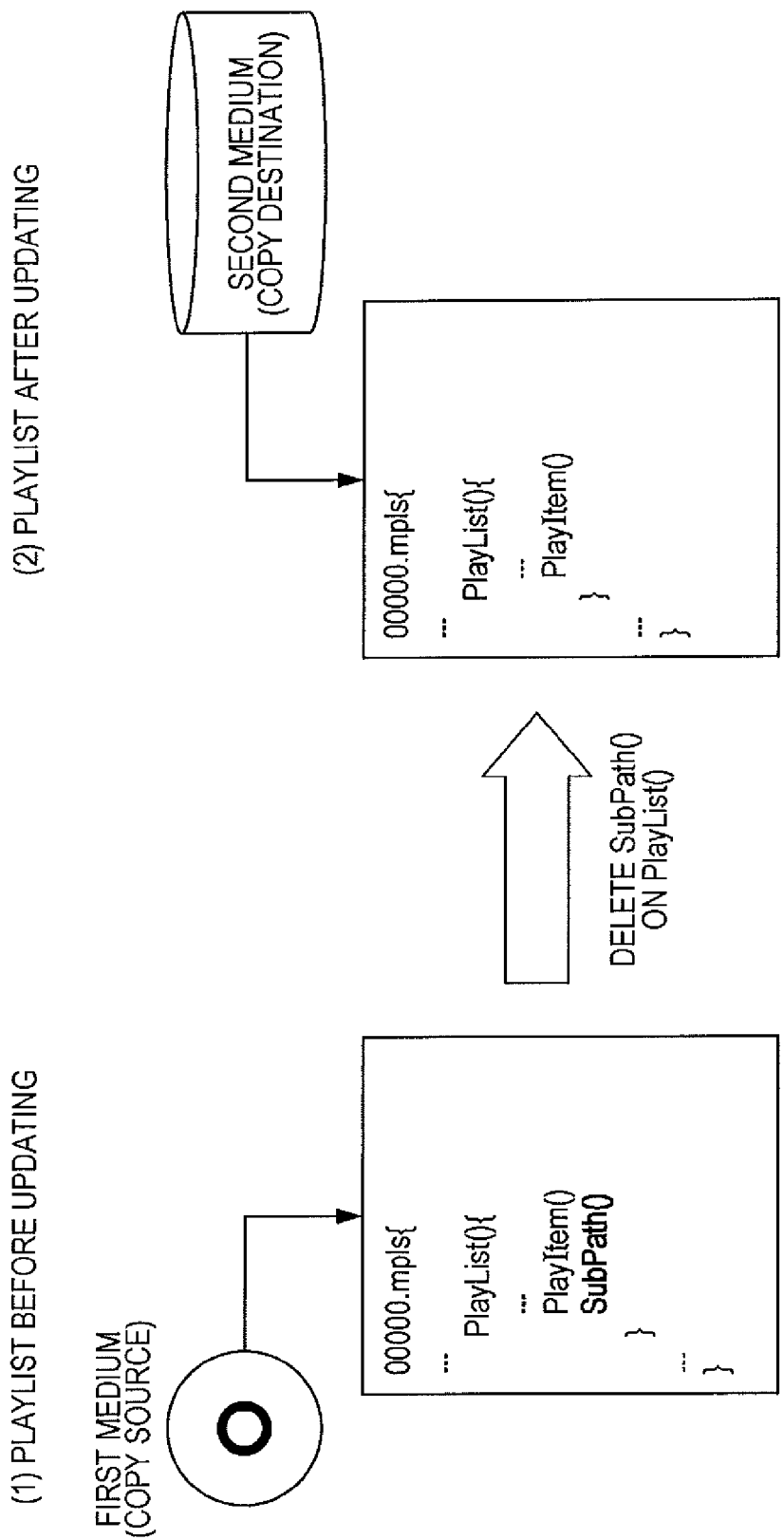

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-155699 filed in the Japanese Patent Office on Jul. 8, 2010, the entire content of which is incorporated herein by reference.

BACKGROUND

The present technology relates to an information processing apparatus, an information processing method, and a program. Specifically, the disclosure further relates to an information processing apparatus, an information processing method, and a program for performing copying data recorded on a medium (information recording medium) of a disc or the like under predetermined management.

Recently, DVDs (Digital Versatile Discs), BDs (Blu-ray Discs (registered trademark)), and the like are frequently used as information recording media (media) of various forms of content including movies, music, and the like. Producers, distributors, or the like of most content including music data, image data, and the like recorded on these information recording media own the copyright or the distribution rights to the content. Therefore, even if a user purchases a disc, he or she is restricted to a certain degree in the use of the content recorded on the disc. For example, unlimited copying of the content recorded on the disc to another disc, or the like is not permitted.

As a configuration of managing copying content stored in a media as above, a management configuration is known in which copying is permitted under a condition that copy permission information is obtained from a management server (MC: Managed Copy). The specific sequence of the managed copy (MC) is as follows.

A medium such as a content storing disc, or the like is loaded into a user device including a PC, a recording and reproducing device, or the like, and the user device is connected to the management server via a network.

After that, the user device transmits pre-defined information including a disc identifier (ID), or the like to the server.

The server verifies the authenticity of the received information, and then transmits copy permission information to the user device.

The user device starts a copy process with the condition that the copy permission information has been received from the server.

The copy process of the disc storing content to another medium is permitted as the sequence.

This copying management configuration is referred to as Managed Copy (MC), and detailed description thereof is disclosed in, for example, Japanese Unexamined Patent Application Publication No. 2008-98765.

On the other hand, there is the AACS (Advanced Access Content System) standard as a standard relating to a technology of protecting the copyright of content. Most content recorded on discs including BDs complying with the AACS standard is recorded as encrypted content. As a representative encryption configuration of the AACS standard, there is a configuration in which content is divided by units and different encryption keys are applied to the units. By adopting such an encryption configuration, it is possible to control the use of content by units, and to realize strict control of various content uses.

A unit into which content is divided is called a CPS unit, and an encryption key applied to an encryption process and a decryption process of each CPS unit is called a CPS unit key, a unit key, or a title key.

When content stored on a medium such as a BD storing movies or the like of which the copyright is the object to be managed is to be copied to another medium, for example, a hard disk, a flash memory, another disc, or the like in the user device as described above, copying is performed after receiving copy permission information from the management server in accordance with the above-described managed copy (MC).

However, in both cases where a BD recording the original content is loaded for reproduction and where copied content is to be reproduced from a copy destination medium in respective reproduction processing devices, reproduction processing programs to be used are sometimes different.

When reproduction is to be performed by loading the BD recording the original content in a reproduction processing device, the reproduction can be performed using, for example, a program corresponding to the content stored in the disc. However, when reproduction is to be performed for content from a copy destination medium, it is thought that there are many cases where the program stored in the disc is not used, but a general-purpose moving image reproduction program is used.

Recently, various image reproduction programs have been circulated. For example, there are many cases where a moving image reproduction program stored in a PC or the like in advance or a program downloaded via a network is used. Specifically, general-purpose programs for moving image reproduction such as the Windows (registered trademark) Media Player and the like are mostly used.

As such, it is highly possible that copied content recorded from a disc to another medium is not reproduced by a reproduction program dedicated to content recorded on the copy source disc, but reproduced using such a general-purpose moving image reproduction program.

Such content stored on a disc such as a BD includes various types of content. For example, such various types of content include content for changing the reproduction sequence according to a so-called navigation command which can change the reproduction sequence according to a user's instruction, a browsable slideshow, content for displaying a pop-up menu according to commands input by a user, and the like.

However, there is a possibility that the complicated reproduction process of content can be correctly used for reproduction with a reproduction program dedicated for the content set corresponding to the disc-stored content, but is not used in a reproduction process using other general-purpose moving image reproduction programs.

SUMMARY

The present technology is achieved taking the above circumstances into consideration, and in the case where content recorded on a first medium, for example, a BD, or the like is copied to another second medium for use, it is desirable to provide an information processing apparatus, an information processing method, and a program which analyze whether or not data that is not likely to be used in the copy destination is included and send notification of restriction on copied data, a warning to a user, or the like according to the analysis result.

According to an embodiment of the present technology, there is provided an information processing apparatus which includes a data processing unit which executes a copy process for recording data recorded on a first medium onto a second medium, and the data processing unit executes a questionable data discrimination process for discriminating questionable data which is highly likely to be not normally reproduced in a reproduction process in which a reproduction program different from a dedicated reproduction program to the data recorded on the first medium is applied, and executes at least any of processes, which include a questionable data deletion process for deleting the questionable data from a copy target or a warning notification process for notifying a user of a possibility that copied data will not be normally reproduced, according to the discrimination result in the questionable data discrimination process.

Furthermore, according to the embodiment of the information processing apparatus of the technology, the data processing unit executes the questionable data discrimination process with reference to a file recording reproduction control information recorded on the first medium.

Furthermore, according to the embodiment of the information processing apparatus of the technology, the data processing unit discriminates whether or not a playlist file includes a subpath that is reproduction designation information of sub data in addition to a playitem that is reproduction designation information of main data with reference to the playlist file recorded on the first medium, and performs a process of discriminating reproduction data using the subpath as the questionable data.

Furthermore, according to the embodiment of the information processing apparatus of the technology, the data processing unit discriminates whether or not a playlist file includes a subpath that is reproduction designation information of sub data in addition to a playitem that is reproduction designation information of main data with reference to the playlist file recorded on the first medium, and executes a discrimination process of the questionable data according to subpath type information set in the playlist file.

Furthermore, according to the embodiment of the information processing apparatus of the technology, when the subpath type indicates that a subpath of a type is used at least any data reproduction of a browsable slideshow, an interactive application, text subtitles, and Picture-in-Picture, the data processing unit performs a process of determining that reproduction data using the subpath is questionable data.

Furthermore, according to the embodiment of the information processing apparatus of the technology, the data processing unit discriminates that data reproduced according to a playitem that is reproduction designation information of main data set in a playlist file includes a stream resulted from multiplexing interactive graphics data with reference to the playlist file recorded on the first medium, and performs a process of determining that the data is questionable data when the data is discriminated to include the stream.

Furthermore, according to the embodiment of the information processing apparatus of the technology, the data processing unit refers to a clip information file recorded on the first medium, and executes a discrimination process of questionable data according to application type information recorded in the clip information file.

Furthermore, according to the embodiment of the information processing apparatus of the technology, when a deletion process of the questionable data from the copy target is executed, the data processing unit executes an updating process of the file recording the reproduction control information recorded on the second medium, together with the deletion process.

Furthermore, according to the embodiment of the information processing apparatus of the technology, when the deletion process of the questionable data from the copy target is executed, the data processing unit executes a playlist file updating process in which the playlist file is set to a file having reproduction control information corresponding to non-deletion data, together with the deletion process.

Furthermore, according to the embodiment of the information processing apparatus of the technology, when the deletion process of the questionable data from the copy target is executed, the data processing unit executes a clip information file updating process in which a clip information file is set to a file having reproduction control information corresponding to non-deletion data, together with the deletion process.

Furthermore, according to the embodiment of the information processing apparatus of the technology, when the deletion process of the questionable data from the copy target is executed, the data processing unit executes an EP map updating process in which an EP map included in the clip information file is set to an EP map constituted by packet information corresponding to non-deletion data, together with the deletion process.

Furthermore, according to the embodiment of the information processing apparatus of the technology, the information processing apparatus further includes a communication unit which executes communication between a management server, and the data processing unit displays a list of copy permitted data included in the data recorded on the first medium based on received information from the management server, and selects data to be copied based on user designation for the display information.

Furthermore, according to another embodiment of the technology, there is provided an information processing method executed by an information processing apparatus, including data-processing by a data processing unit to execute a copy process for recording data recorded on a first medium onto a second medium, and the data processing includes executing a questionable data discrimination process for discriminating questionable data which is highly likely to be not normally reproduced in a reproduction process in which a reproduction program different from a dedicated reproduction program to the data recorded on the first medium is applied, and executing at least any of processes, which include a questionable data deletion process for deleting the questionable data from a copy target or a warning notification process for notifying a user of a possibility that copied data will not be normally reproduced, according to the discrimination result in the questionable data discrimination process.

Furthermore, according to still another embodiment of the technology, there is provided a program executed by an information processing apparatus for processing information, which includes data-processing in a data processing unit to execute a copy process for recording data recorded on a first medium onto a second medium, and the data processing includes causing execution of a questionable data discrimination process for discriminating questionable data which is highly likely to be not normally reproduced in a reproduction process in which a reproduction program different from a dedicated reproduction program to the data recorded on the first medium is applied, and to execute at least any of processes, which include a questionable data deletion process for deleting the questionable data from a copy target or a warning notification process for notifying a user of a possibility that copied data will not be normally reproduced, according to the discrimination result in the questionable data discrimination process.

Furthermore, the program of the technology is a program that can be provided with a recording medium and a communication medium provided in a computer readable form to an information processing apparatus or a computer system that can execute various program codes. By providing such a program in a computer readable form, processes according to the program are realized on the information processing apparatus or the computer system.

Other objects, characteristics, and advantages of the technology will be clarified by more detailed description based on an embodiment and accompanying drawings of the technology to be described later. Furthermore, a system in the present specification is a logically assembled configuration of a plurality of devices, and is not limited to a system in which devices of each configuration are included in one housing.

According to a configuration of the embodiments of the technology, in a data copy process between media, the apparatus and the method are provided which execute discrimination of data which blocks normal reproduction of copied content and copy control. Specifically, when a copy process is executed in which data recorded on a first medium is recorded on a second medium, questionable data, which is highly likely to be not normally reproduced when a reproduction program different from a reproduction program dedicated to data recorded on the first medium is applied, is discriminated with reference to a reproduction control information file such as a playlist file, or the like. According to the discrimination result in a questionable data discrimination process, a questionable data deletion process for deleting the questionable data from copy targets, a warning notification process for notifying a possibility of abnormal reproduction of copied data to a user, or the like is executed.

BRIEF DESCRIPTION OF THE DRAWINGS

FIG. 2 is a diagram illustrating a unit configuration and a unit key management table;

FIG. 4 is a diagram illustrating the sequence of a copy process (MC) by the management of a management server;

FIG. 5 is a diagram illustrating composing data of a copy control management file (MCMF: Managed Copy Manifest File) that is recording information of a first medium;

FIG. 6 is a diagram showing an example of data included in a copy execution request;

FIG. 7 is a diagram illustrating basic information included in server response information (Offer Response);

FIG. 8 is a diagram illustrating an example of a copy process from the first medium that is the copy source to the second medium that is the copy destination (hard disk (HDD));

FIG. 11 is a diagram illustrating the syntax (data structure) of the playlist file (PlayList( );

FIG. 12 is a diagram showing the syntax of a subpath (SubPath( ) that is one field of the playlist file shown in FIG. 11;

FIG. 13 is a diagram illustrating a setting example of a subpath type (SubPath_type);

FIG. 14 is a diagram illustrating an example of application type information (application_type) set in a clip information file;

FIG. 15 is a diagram showing a flowchart describing the sequence of the copy process executed by an information processing apparatus of the technology;

FIGS. 20A to 20D are diagrams illustrating an EP map;

FIG. 21 is a diagram showing an example of a playlist file updating process;

DETAILED DESCRIPTION OF EMBODIMENTS

Hereinafter, an information processing apparatus, an information processing method, and a program of the present technology will be described in detail with reference to the drawings. Furthermore, description will be provided according to the following items.

1. Overview of Content Copy Control Process Based on Server Management
2. Regarding Example of Content Recording Configuration
3. Regarding Sequence of Content Copy Process based on Server Management
4. Regarding Problem that occurs in Reproduction Process of Copied Content and Overview of Process executed in Information Processing Apparatus of Present Technology
5. Regarding Information referred for Execution of Copy Control
   5-1. Regarding Reference Information of Playlist File
   5-2. Regarding Reference Information of Clip Information File
6. Regarding Specific Example of Copy Control executed by Information Processing Apparatus of Present Technology
7. Regarding Sequence of Copy Process executed by Information Processing Apparatus of Present Technology
8. Regarding Configuration Example of Information Processing Apparatus

[1. Overview of Content Copy Control Process based on Server Management]

Figure 1:
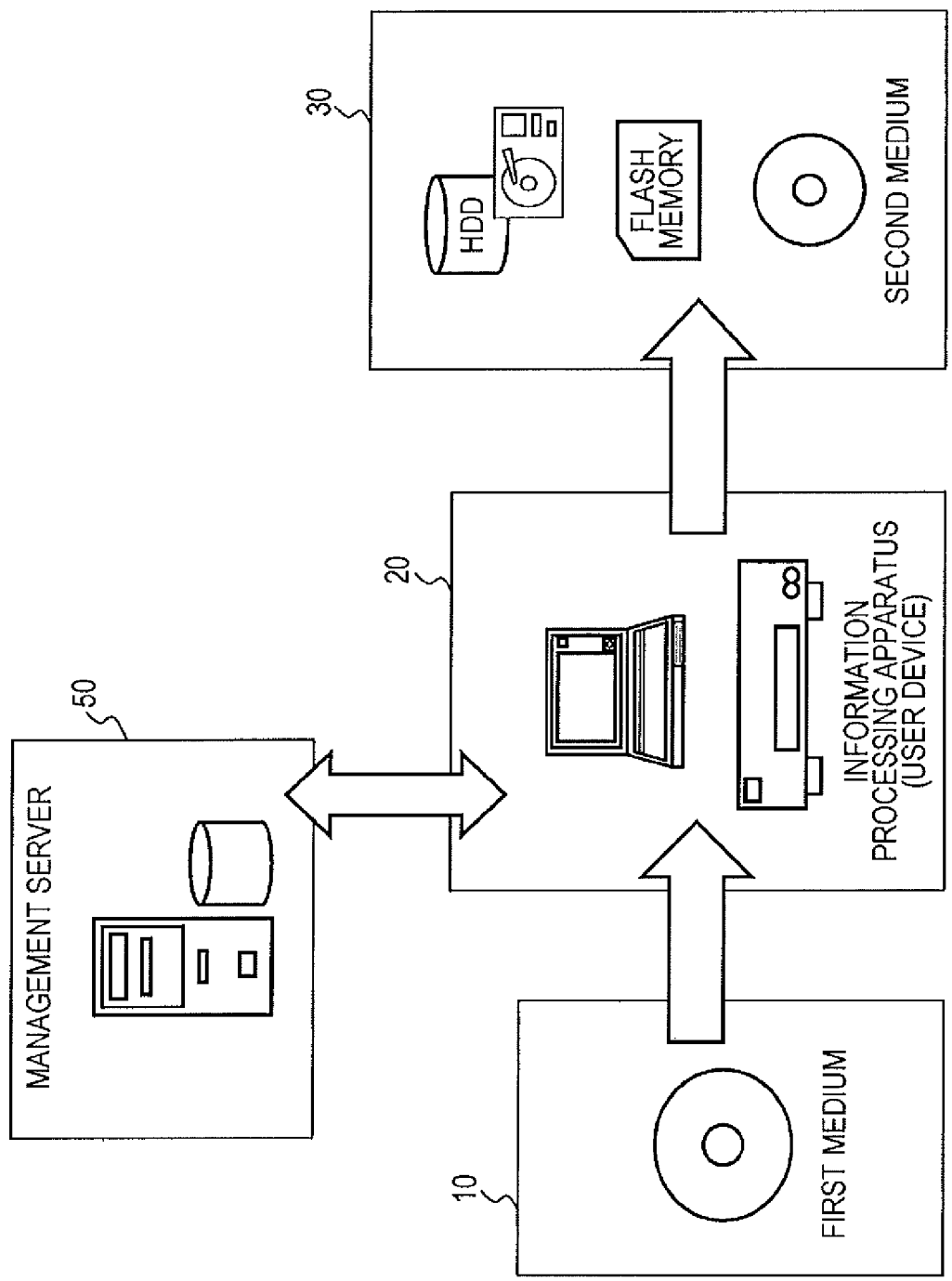
FIG. 1 is a diagram illustrating the overview of a managed copy (MC) system according to an embodiment of the present technology.

First, the overview of a content copy control process based on server management will be described with reference to FIG. 1.

The use of most content such as a movie recorded on, for example, a BD or the like is permitted under predetermined copyright management. Thus, even a user who purchased a disc is restricted in the use of content recorded on the disc to a certain degree. For example, it is not permitted that the content recorded on the disc be copied without limit to a medium such as another disc.

As such a copy management configuration of content stored on a medium, there is a configuration of a copy permission process on condition of obtaining copy permission information from a management server. FIG. 1 is a diagram illustrating the overview of a managed copy (MC) system as an example thereof.

An information processing apparatus 20 is a PC, a recorder (recording and reproducing apparatus), or the like of a user, and can be loaded with a first medium 10 on which movies or the like that are content as a copyright management target restricted in use are recorded for reproduction.

The information processing apparatus 20 enables a process of copying the content recorded on the first medium 10 to a second medium 30 that is another medium. The second medium 30 is a medium that can be used for recording in the information processing apparatus 20, and includes, for example, a hard disk (HDD), a flash memory, a data recordable disc (a BD, a DVD, or the like), or the like.

However, if a user is allowed to freely perform a copy process, duplication of content occurs en masse, thereby bringing about illegal use or distribution of copied content. In order to prevent such incidents, when the information processing apparatus 20 that is a user device executes copying of content, the apparatus is subject to connection to a management server 50 and acquisition of copy permission information from the management server 50. For the acquisition of the copy permission information, for example, it is necessary to verify the authenticity of the first medium that the user possesses and payment of a predetermined fee.

The information processing apparatus 20 as a user device can acquire copy permission information from the management server 50 and copy the content on condition of acquiring the copy permission information by performing a predetermined procedure. This is the overview of the managed copy (MC).

[2. Regarding Example of Content Recording Configuration]

Next, a configuration example of data recorded on a medium (the first medium 10 of FIG. 1) recording, for example, use-controlled content of which copyright is managed and which is the object of the above-described managed copy (MC) will be described.

Most content such as movies recorded on a general disc recording content thereon, for example, a BD-ROM is recorded after encryption for the purpose of preventing illegal uses such as illegal copying, or the like.

The encrypted content complying with the AACS standard that is a standard relating to a content copyright protection technology is divided by units, and recorded as encrypted data to which different encryption keys are applied for each unit as described above. With the configuration of encryption for each unit, the control of use by each unit is possible and strict control of various content uses is realized.

The unit which is a unit for dividing content is called a content management unit or a CPS unit, and an encryption key corresponding to each CPS unit is called a CPS unit key, a unit key, or a title key. The correspondence relationship between division of units of content recorded on a disc and encryption keys (unit keys) is shown in FIG. 2.

FIG. 2 is an example of a unit key management table showing the correspondence relationship between units (CPS units) constituting content recorded on a medium, for example, one disc and CPS unit keys that are encryption keys. The unit key management table is recorded on a medium (a BD or the like) together with encrypted content.

As shown in FIG. 2, the CPS units that are data composing content are divided into CPS units 1 to n. Each of the CPS units 1 to n is made to correspond to each CPS unit key that is a dedicated encryption key.

For example, when the CPS unit 1 (CPS1) is to be reproduced, decryption is performed using a CPS unit key 1 (Ku1). When the CPS unit 2 (CPS2) is to be reproduced, it is necessary to perform decryption with the application of a CPS unit key 2 (Ku2). As an index corresponding to each CPS unit or CPS unit key, for example, a "title" is used. The "title" is an index set by corresponding to each CPS unit, and a CPS unit and a CPS unit key can be specified by specifying a title.

Figure 3:
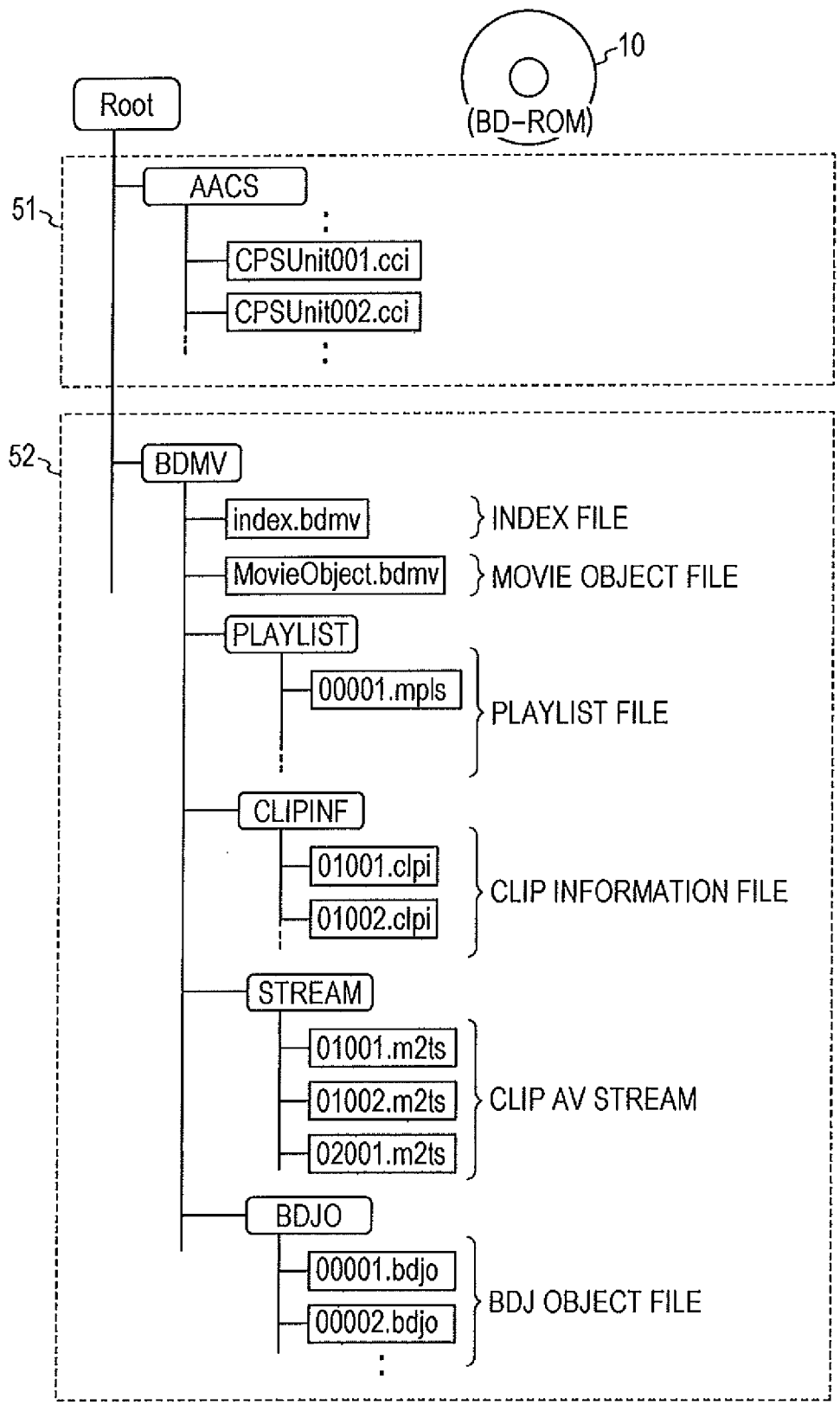
FIG. 3 is a diagram illustrating an example of a directory structure of a medium.

FIG. 3 is of a directory in the case where the first medium 10 is a ROM-type Blu-ray Disc (registered trademark), and shows a directory configuration corresponding to recording data of a BD.

The directory is separated into a management information setting part 51 (AACS directory) and a data part (BDMV directory) as shown in FIG. 3.

The management information setting part 51 (AACS directory) stores a CPS unit key file, a use control information file, or the like.

On the other hand, under the BDMV directory in the data part 52, the following files are recorded, for example: an index file; a movie object file; a playlist file; a clip information file; a clip AV stream file; and a BDJO file.

In the index file, title information as index information applied to a reproduction process is stored. The title is the same as registered one in the unit key management table previously described with reference to FIG. 2, and data corresponding to a CPS unit.

The movie object file is a file storing a program for reproduction.

The playlist file is a file setting the reproduction sequence of content. A playlist file is selected by a title that a user selects, and a specific clip information file is designated as a reproduction target according to a playitem or path information included in the selected playlist file.

The clip information file is a file designated by the playlist file, and includes reproduction location information of the clip AV stream file, or the like.

The clip AV stream file is a file storing AV stream data that is the reproduction target.

Furthermore, there is a case where the clip information file and the clip AV stream file are called a clip or a clip file together.

The BDJO file is a file storing execution control information of a file storing a JAVA (registered trademark) program, command, or the like.

As described above, image data and audio data that are the reproduction target are stored in the clip AV stream file, and the index file, the movie object file, the playlist file, and the clip information file store various reproduction control information such as an index, a program, sequence information, data location information, and the like which are necessary for reproducing the image data and the audio data stored in the clip AV stream file, and the files are used as recording files of the reproduction control information.

The sequence in which an information processing apparatus reproduces content recorded on an information recording medium is as follows.

First, a specific title is designated from the index file by a reproduction application.

A reproduction program relating to a designated title is selected.

A playlist stipulating the reproduction order of the content or the like is selected according to program information of the selected reproduction program.

Based on the clip information stipulated in the selected playlist, the AV stream or a command as content actual data is read, and the reproduction of the AV stream or an execution process of the command is performed.

In the content reproduction process, a unit and a unit key previously described with reference to FIG. 2 can be discriminated according to the selected title, the unit key corresponding to a unit as the reproduction target (encrypted content) is acquired, and a decryption process by units can be performed. When the copy process described with reference to FIG. 1 is to be executed, information acquired from the management server 50 is referred to, and data to be copied is specified to execute the copy process.

[3. Regarding Sequence of Content Copy Process Based on Server Management]

Next, the sequence of content copy process based on the server management will be described with reference to FIG. 4 and succeeding drawings. FIG. 4 is a diagram illustrating the sequence of the managed copy (MC) that is an example of a content copy process based on the server management.

FIG. 4 shows, from the left side, a first medium 110 such as a ROM disc on which content including movies has been recorded; an information processing apparatus 120 as a user device which reads data such as content from the first medium 110 and performs a copy process; a second medium 150 which is a medium as a content copy destination and constituted by a hard disk (HDD), a flash memory, an R/RE disc, or the like; a management server (MC server) 140 which executes a process of providing information such as content copy permission or the like.

The information processing apparatus 120 is constituted by, for example, a PC, a recording and reproduction apparatus, or the like, input with data read from the first medium 110, and executes a process of recording the data to the second medium 150 as a copy destination medium constituted by a hard disk (HDD), a flash memory, a R/RE disc, or the like, that is, a content copy process.

The first medium 110 is, for example, a ROM-type Blu-ray Disc (registered trademark), a DVD disc, or the like. The second medium 150 is a medium on which data can be written, and specifically includes, for example, a hard disk (HDD), a flash memory, an R-type and RE-type Blu-ray disc (registered trademark), a DVD disc, or the like.

The first medium 110 constituted by, for example, a ROM-type disc, or the like is recorded with encrypted content 113 that is use-controlled content as shown in the drawing. The encrypted content 113 includes content constituted by, for example, AV (Audio Visual) streams of moving image content such as HD (High Definition) movie content that is high-definition moving image data, music data, game programs, image files, audio data, text data, or the like.

The encrypted content 113 has a use management configuration by a content management unit (CPS unit) as previously described with reference to FIG. 2, and is encrypted content subjected to encryption with application of difference unit keys (CPS unit keys) by CPS units. In other words, in order to realize use control differently performed for each data piece divided by units, the encryption is performed with difference keys (also called CPS unit keys, unit keys, or title keys) for each unit.

Furthermore, the first medium 110 stores management data (AACS Data) 112 constituted by use control information, key information applied to decryption of the encrypted content 113, or the like, and further stores a copy control management file (MCMF: Managed Copy Manifest File) 111 used in a copy process of content recorded on the first medium 110. The copy control management file (MCMF) will be described later.

The management data 112 indicated as recording information of the first medium 110 shown in FIG. 4 is management data stipulating the AACS (Advanced Access Content System) that is a standardized management system relating to, for example, the content copyright protection technology, and data including a CPS unit key file storing keys (unit keys) applied to the decryption of the encrypted content 113, license information, content certificate (CC) indicating authenticity of the content, encryption key blocks (MKB (Media Key Block)) storing media keys for acquiring the CPS unit keys.

The MKB will be briefly described. The MKB is an encryption key block generated based on a key distribution system of a tree structure which is known as a broadcast encryption system. The MKB is a key information block that enables the acquisition of a media key [Km] that is a key necessary for decryption of content only by a process (decryption) based on a device key [Kd] stored in an information processing apparatus of a user who holds a valid license. This is a block to which an information distribution system is applied according to a so-called hierarchical tree structure, and the block makes the acquisition of the media key [Km] possible only when a user device (information processing apparatus) holds a valid license, and makes the acquisition of the media key [Km] not possible in an invalidated (revoked) user device. A memory of the information processing apparatus 120 shown in FIG. 4 stores a device key [Kd].

A copy control management file 111 (MCMF: Managed Copy Manifest File) indicated as recording information of the first medium 110 of FIG. 4 is a file applied when a copy process of content 113 recorded on the first medium 110 is executed, and for example, XML description data including data shown in FIG. 5.

(1) URL of the management server: This is access information to the management server providing copy permission information, and access information for the management server 140 shown in FIG. 4.

(2) Copy data information (dealManifest)

(2-1) Playlist file name: This is a file name of a playlist to be copied.

(2-2) CPS unit key information: This is identification information of a CPS unit key applied to a decryption process of copy target content.

(2-3) Copy unit identifier: This is unit identification information of a copy unit (MC unit) indicating a unit of copying of managed copy (MC).

(3) Content ID: This is an identifier of content that is the copy content. For example, numbers of ISAN (International Standard Audiovisual Number) are used as content code information.

With reference to FIG. 4, a process sequence will be described in which the encrypted content 113 recorded on the first medium 110 that is a ROM-type disc is copied to another medium including the second medium 150 or the like constituted by a hard disk, an R/RE disc, or the like.

The information processing apparatus 120 first transmits a copy execution request (Offer Request) to the management server 140 with the application of server information (the URL or the like) stored in the copy control management file (MCMF) 111 recorded on the first medium 110 in Step S11.

At this time, a content ID corresponding to the content that is the copy processing target or the like is transmitted to the management server 140.

An example of data included in the copy execution request is shown in FIG. 6. As shown in FIG. 6, the copy execution request includes data, for example, as follows:

(a) Content ID: Identifier of content stored in the first medium (b) Content certificate ID: A certificate for verifying the authenticity of the above content (c) Medium identifier: An identifier of the first medium that is the copy source (d) Random number: Data for verifying data authenticity (e) Language code: Information of a language code used by the information processing apparatus.

Each piece of information of (a) to (c) in the above is read from the first medium 110. (d) A random number is generated in the information processing apparatus 120. (e) The language code is transmitted by acquiring the language code recorded on the memory of the information processing apparatus 102 in advance.

Furthermore, the language code is used for determining the language of detailed offer information included in the response provided by the management server 140 or the like.

Returning to FIG. 4, the description of the sequence of the content copy process according to the server management will be continued. The management server 140 executes a verification process of the authenticity of reception information of the content ID received from the information processing apparatus 120 in Step S12, and when it is confirmed that there is no problem, server response information (Offer Response) 131 is generated and transmitted to the information processing apparatus 120.

Basic information included in the server response information (Offer Response) 131 provided by the management server 140 to the information processing apparatus 120 will be described with reference to FIG. 7.

The basic information includes the following information:
(1) Detailed offer information
  (1a) Title/Abstract/Description (title/abstract/description): Information of title, abstract, and description corresponding to copy permitted content
  (1b) Copy unit identifier (MCU): Identifier for identifying a copy unit as a unit of copying
  (1c) Price information (price): Information of copy price
  (1d) Additional price information (priceInfo): Additional information of price
  (1e) URL of payment server (financialHTMLURL): Access information to the server that performs a payment process of a copy fee
  (1f) Copy destination information (mcotInfo): Information indicating the type, or the like of a medium permitted as a copy destination device. The information includes the type of a medium, for example, an HDD, a flash memory, or the like.
(2) Random number (mcmNonce): A random number for verifying data authenticity.
(3) Copy data information (File name to be copied) (=dealManifest).
  (3a) Playlist file name (PlayList file name): A file name of the playlist to be copied. A clip information file or a clip AV stream file also can be specified by specification of the playlist.
  (3b) CPS unit key information (Index to identify the CPS Unit Key): Identification information of a key (CPS unit key) for decrypting copy content.
  (3c) Copy unit identifier (MCUi): Identification information of a copy unit (MCU) indicating a unit of copying.
(4) Server public key certificate (MCScert): A certificate storing a public key of a server used in encryption communication, signature verification, or the like.
(5) Signature (signature): Signature data for verifying falsification for the entire data The above information is basic information included in the server response information (Offer Response) 131 provided by the management server 140 to the information processing apparatus 120. The information is set for each copy unit (MCU) as a unit of a copy process.

For example, even for the same content A, the copy unit is set according to a copy destination medium. In other words, the setting is performed as:
  a copy unit 0001 of the content A for a hard disk; and
  a copy unit 0002 of the content A for a flash memory.

Furthermore, the server response information (Offer Response) 131 shown in FIG. 7 includes the same information as the information stored in the copy control management file (MCMF) 111 recorded on the first medium 110 described with reference to FIG. 5 before. In other words, the information is (3) copy data information (File name to be copied) (=dealManifest) described above. The information is subjected to a copy process prior to reception information from the management server 140. The reason is that the reception information from the management server 140 has the possibility of being updated sequentially.

Returning to FIG. 4, the description of the sequence of the content copy process according to the server management will be continued. The management server 140 executes the verification process of the authenticity or the like of the received information of the content ID or the like received from the information processing apparatus 120 in Step S12, and when it is confirmed that there is not a problem, the server response information (Offer Response) 131 is generated and transmitted to the information processing apparatus 120.

The information processing apparatus 120 that receives the server response information (Offer Response) 131 displays a list of copy permitted content (copy permission list 121) on a display unit of the information processing apparatus 120 with application of the response information (Offer Response) 131 received from the management server 140. The list sets, for example, the price, or the like for executing copying each content piece.

In Step S13, a user executes the selection of content for designating content as the copy target from the list of copy permitted content. Furthermore, in Step S14, the information processing apparatus 120 executes a payment process for a copy process between the management server 140. Specifically, a transfer process of payment data 132 is performed between the information processing apparatus 120 and the management server 140. Furthermore, a server which executes the payment process may be a payment server different from the management server. In addition, when copying of content of which a copy process is set to free of charge is to be executed, the payment process is omitted.

After completion of the payment process executed according to necessity, the information processing apparatus 120 transmits a request of copy permission information to the management server 140 in Step S15. The management server 140 checks the completion of the payment, generates copy permission information 122, and transmits the information to the information processing apparatus 120 according to the request of the copy permission information from the information processing apparatus 120 in Step S16.

The information processing apparatus 120 executes a content copy process in Step S17 with the condition of receiving the copy permission information 122 from the management server 140. In other words, the encrypted content 113 is read from the first medium 110, a decryption process is performed with the selection of data to be copied, and data copying is performed on the second medium 150 constituted by a hard disk (HDD), a flash memory, an R/RE disc or the like that is a copy destination.

Furthermore, the content copy process is executed, for example, in the following order. The sequence of the process is:

(1) Reading of encrypted content from the first medium 110 (copy source medium);

(2) Decryption process of the encrypted content according to a first management system corresponding to the first medium 110 (copy source medium);

(3) Encryption process of the content according to a second management system corresponding to the second medium 150 (copy destination medium); and (4) Recording process of the encrypted content on the second medium 150 (copy destination medium).

As such, when encrypted content is read from a disc and copied to a medium such as another disc or the like, the encrypted content to be copied is decrypted first, and then a process in which re-encryption is executed according to a standard of a copyright management system corresponding to the copy destination medium for recording is performed. By performing the process, use control is possible in the copy destination medium, and illegal use and distribution of copied content can be prevented.

Furthermore, a collective term of a content copyright management system relating to digital data is a DRM (Digital Rights Management) system. Media recordable with digital data is diversified, and various DRM systems according to the media are adopted. When digital data is copied between media adopting different DRM systems, copying is performed after changing from a DRM system that a copy source medium adopts to a DRM system that a copy destination medium adopts. With such a configuration, illegal use and distribution of copied content can be prevented.

In that case, if a management system of the copy source (set to a first DRM) and a content management system of the copy destination (set to a second DRM) are different from each other, it is necessary that encrypted content of the copy source is decrypted following the sequence of the above-described (1) to (4) first, and a process according to the management system of the copy destination (the second DRM), for example, recording by using a different encryption key and performing re-encryption and encoding is performed.

When the first management system is a system according to the AACS standard, a decryption process of the encrypted content according to the above-described first management system of (2) is performed as a decryption process by CPS units with application of CPS unit keys.

Furthermore, the second management system corresponding to a copy destination medium (the second medium 150) may adopt the AACS standard, and is considered to be another management system such as CPRM, MagicGate, VCPS, or the like, corresponding to various standards according to the media.

FIG. 8 shows an example of specific copying. FIG. 8 shows the first medium 110 that is the copy source and a hard disk (HDD) as an example of the second medium 150 that is the copy destination.

As shown in the left side of FIG. 8, the first medium 110 is recorded with various files according to the directory configuration previously described with reference to FIG. 3. A process is executed in which specific files are selected from a number of the files, and only the selected files are copied to the hard disk (HDD) that is the second medium 150.

An example is shown where files indicated by thick lines are selected from the directory of the first medium 110 shown in the left side of FIG. 8 and copied. In other words, the following files are selected and copied:

a playlist file (PLAYLIST): 00001.mpls;
a clip information file (CLIPINF): 00011.clpi, 00012.clpi; and
an AV stream file: 00011.m2ts, 00012.m2ts.

As such, in a copy process for example, management information files such as an index file, a movie object file, or the like are not copied, but only the playlist file to the AV stream file are recorded.

Furthermore, the file selection is executed with application of information included in the server response information (Offer Response) 131 previously described with reference to FIG. 7.

As previously described with reference to FIG. 7, the server response information (Offer Response) 131 is recorded with:

(3a) Playlist file name;
(3b) CPS unit key information; and
(3c) Copy unit identifier (MCUi)

as (3) copy data information (File name to be copied) (=dealManifest), a copy unit is selected as a unit of copying with application of the above information, and a playlist file name corresponding to the selected copy unit is acquired to acquire a playlist file. Furthermore, a clip information file and a clip AV stream file designated by the acquired playlist file are acquired. Furthermore, a CPS unit key corresponding to a copy unit is acquired to execute decryption of content such as the clip AV stream file, or the like. Then, furthermore, after an encryption process corresponding to the DRM system of the second medium 150 or the like is executed, a file is set in the hard disk (HDD) that is the second medium 150.

[4. Regarding Problem that Occurs in Reproduction Process of Copied Content and Overview of Process Executed in Information Processing Apparatus of Present Technology]

As described above, even for use-controlled content, a copy process (MC: Managed Copy) is possible under server management, and a user can perform reproduction of the content from the second medium that is the copy destination medium.

As a program applied to the reproduction of the copied content, a general-purpose moving image reproduction program stored in a reproduction apparatus, for example, a PC, or the like can be used. For example, general-purpose programs for moving image reproduction such as the Windows (registered trademark) Media Player and the like are mostly used.

However, in a reproduction process using such a program, a simple process of reproduction by identifying a moving image file can be executed, but there are many cases where a reproduction process is not able to be executed in which designation information of complicated reproduction data in a playlist file included in the original content on, for example, a BD or the like is interpreted.

Specifically, it is difficult to perform correct reproduction of content which enables a change in the reproduction sequence according to, for example, a user's instruction (navigation command), content which enables a browsable slideshow, content for displaying a pop-up menu that is a menu screen for performing a process according to a command input by a user, or the like when a general-purpose program such as the Windows (registered trademark) Media Player, or the like is used.

In the case of the content using the navigation command, content which enables a browsable slideshow, content for displaying a pop-up menu that is a menu screen for performing a process according to a command input by a user, or the like, information for performing a specific reproduction process is recorded in a playlist file including, for example, reproduction designation information of the content, and when a program that can correctly interpret the playlist is used, correct reproduction of the content is possible.

The complicated reproduction process for the content can be executed by correctly interpreting the playlist if a reproduction program dedicated to the content (for example, a program stored in a movie object file) is used, but when other general-purpose moving image reproduction program is used, the interpretation of a complicated playlist file is difficult, and it is highly possible that correct reproduction is not executed. Therefore, if copied content is reproduced from the second medium that is the copy destination using the general-purpose moving image reproduction program, correct reproduction may not be accomplished.

When a process of copying content recorded on the first medium, for example, a BD, or the like to another second medium for is performed, the information processing apparatus according to an embodiment of the technology analyze whether or not data that is not likely to be used in the copy destination is included and send notification of restriction on copied data, warning to a user, or the like according to the analysis result.

A configuration example and a use example the playlist file set on a disc storing the original content that is the copy source will be described with reference to FIG. 9 and succeeding drawings.

Figure 9:
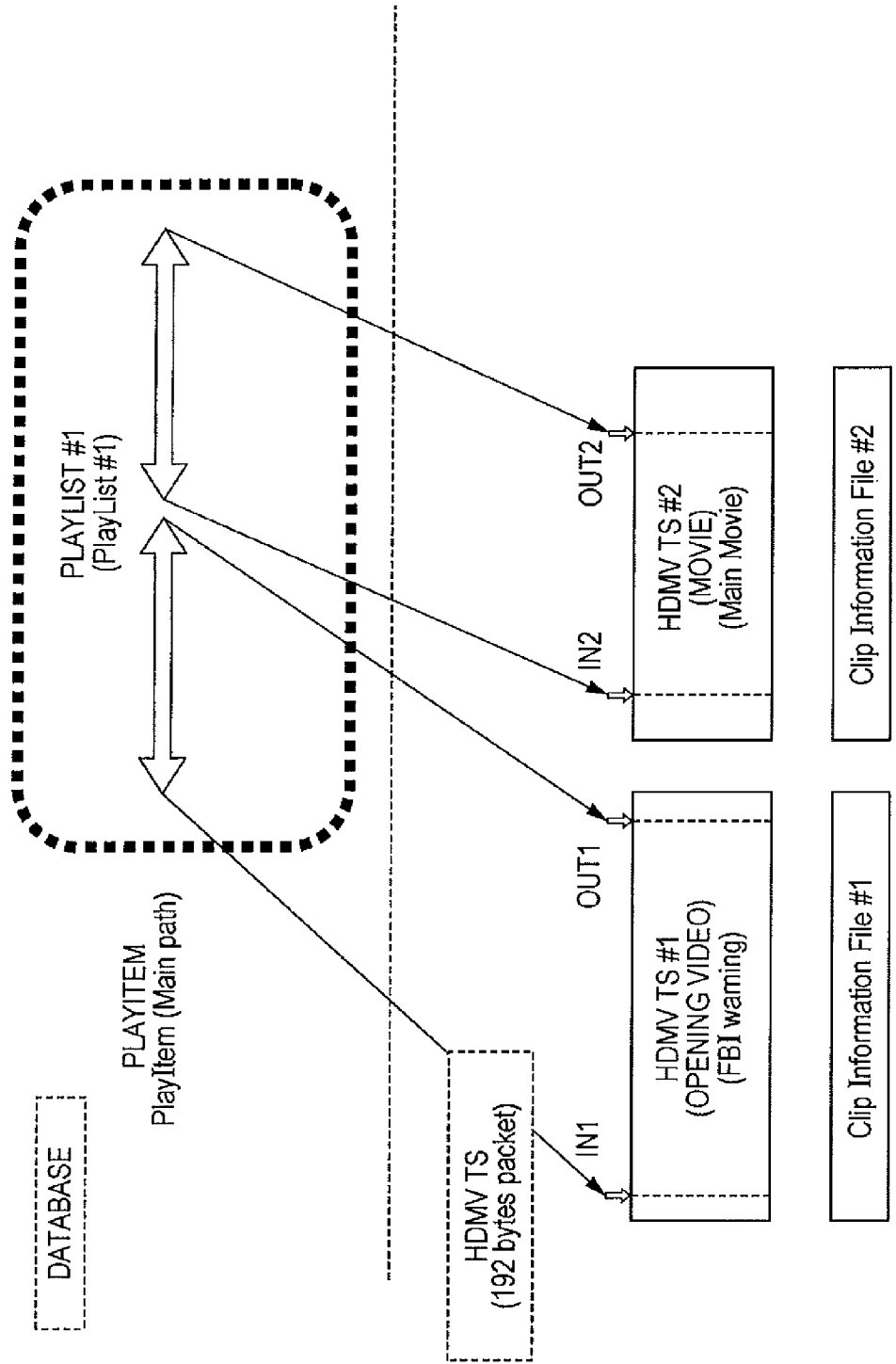
FIG. 9 is a diagram illustrating a structure example and use example of a playlist file.

FIG. 9 shows a content reproduction process example using a PlayList file #1 set on a disc storing the original content that is the content source.

A reproduction process is executed such that a specific playlist is selected, for example, according to a title of which reproduction is designated by a user, and clips (clip information file and clip AV stream file) are selected according to the playlist.

The PlayList file #1 shown in FIG. 9 is an example of a playlist with the simplest configuration. A playitem having reproduction designation information indicating a reproduction start location and end location for the clip information file of video content is set therein. A playitem is composed of two playitems, which are:

a first playitem with a reproduction start point (IN1) and a reproduction end point (OUT1) of the opening video; and a second playitem with a reproduction start point (IN2) and a reproduction end point (OUT2) of the main movie.

When the PlayList file #1 is selected according to, for example, the title of which reproduction is designated by a user, clips (clip information file and clip AV stream file) having the opening video are selected according to the preceding playitem of the PlayList file #1 are selected and reproduced, and after that, clips (clip information file and clip AV stream file) of the main movie are selected and reproduced according to succeeding playitems.

The structure of the playlist file is not limited to a file having a simple structure as the PlayList file #1 shown in FIG. 9. There is a playlist file with a complicated structure for performing various complicated data reproduction processes.

As an example of a playlist file realizing complicated data reproduction, an example of a PlayList file having a subpath will be described with reference to FIG. 10.

Figure 10:
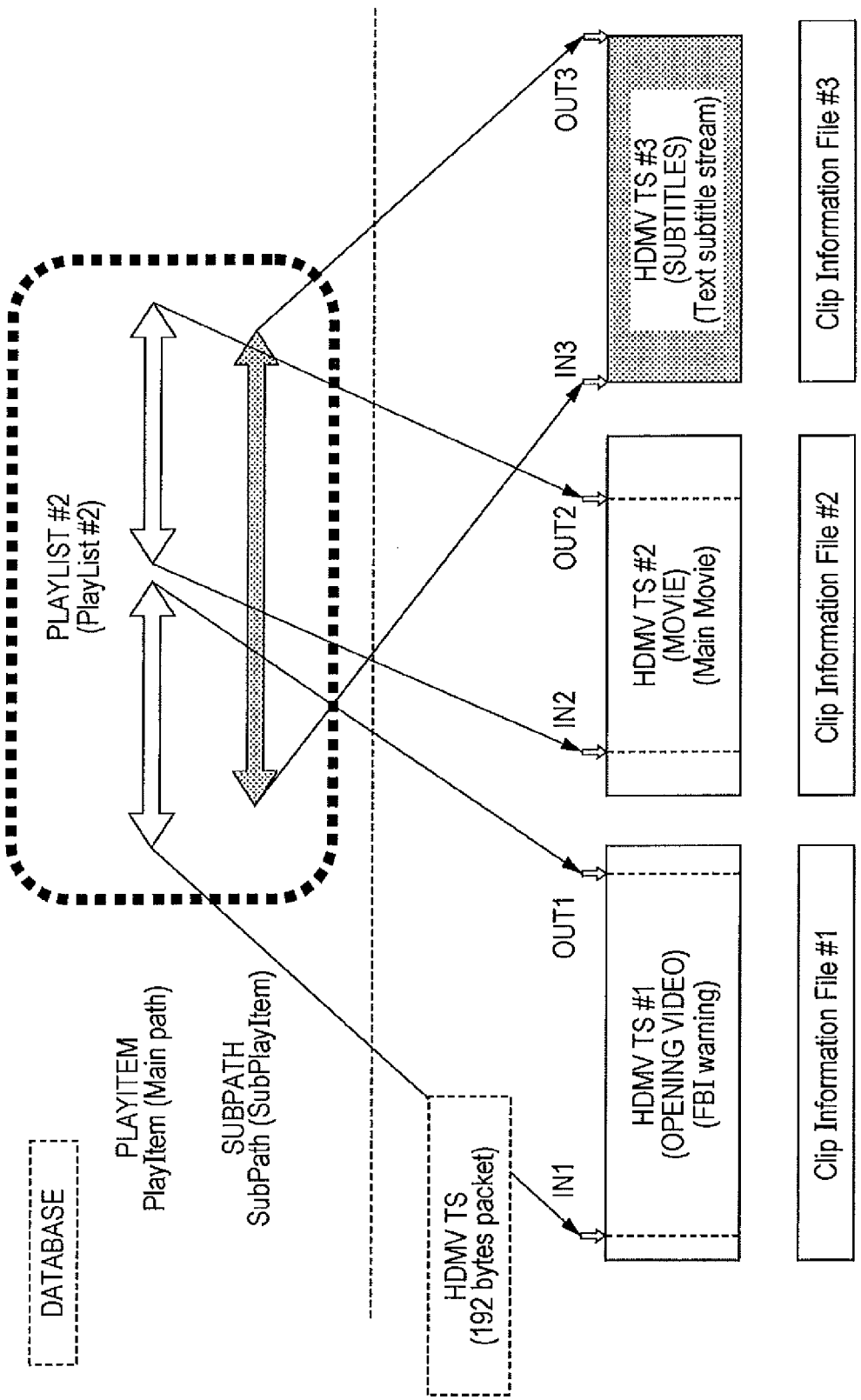
FIG. 10 is a diagram illustrating another structure example and use example of another playlist file.

A PlayList file #2 shown in FIG. 10 is set with a playitem having reproduction designation information indicating the reproduction start location and end location for a clip information file of video content and a subpath having reproduction designation information of subtitles. The playitem is constituted by two playitems, which are:

a first playitem with a reproduction start point (IN1) and a reproduction end point (OUT1) of the opening video; and a second playitem with a reproduction start point (IN2) and a reproduction end point (OUT2) of the main movie.

The subpath is composed as information having a reproduction start point (IN3) and a reproduction end point (OUT3) of subtitle data.

For example, when subtitle data designated by the subpath is a Japanese subtitle, image content is reproduced from a clip information file designated by the playitem of the PlayList file #2 and the subtitle data is reproduced from the clip storing the subtitle data selected with the subpath, in accordance with the reproduction of the content.

When English subtitles are displayed, for example, a different playlist file is used.

When a playlist file includes a playitem and a subpath corresponding to a main path as above, a reproduction process using two pieces of path information is possible, and subtitle reproduction together with video reproduction is possible.

The reproduction process can be assuredly executed if a specific reproduction program according to content, that is, a reproduction program of a movie object file set on a disc storing the original content is used.

However, when copied content is to be reproduced, if a reproduction program that is not a program dedicated to content set corresponding to content, for example, a general-purpose moving image reproduction program such as Windows (registered trademark) Media Player or the like is used, there is a possibility that an interpretation process of the subpath stored in the playlist file is not executed, and thereby not executing the reproduction according to the subpath.

Furthermore, the mode of the reproduction process using the subpath is not limited to subtitle information shown in FIG. 10, but there are various modes such as a browsable slideshow for performing switching reproduction of still images according to a user's command, and a pop-up menu display process that enables the input of a command from a user during the reproduction of the main image.

Furthermore, there are a file set with a subpath as shown in FIG. 10 and a file not set with a subpath as shown in FIG. 9 in a playlist file, and a medium such as a BD or the like storing the original content is recorded with a number of playlist files in different types.

When a playlist only of a playitem not having a subpath that enables only the main image reproduction is selected and reproduced, the main video can be reproduced also using the general-purpose image reproduction program in the copy destination, and it is highly possible that the reproduction of copied content can be performed in the same manner as the reproduction of the original content.

However, when a playlist file set with the subpath for realizing the above-described subtitle reproduction and the input of a user's command is used in addition to the playitem for the reproduction of the main image, if a general-purpose reproduction program different from a dedicated program corresponding to the original content (for example, a program stored in a movie object file) is applied, there is a problem in that it is not possible to reproduce content corresponding to the subpath.

For example, in the playlist file set with the subpath, the playitem as the main path includes reproduction designation information of main video and images, and the subpath retains designation information of, for example, subtitle content, pop-up menu display content for receiving a user's command or the like. Since a general-purpose program such as Windows (registered trademark) Media Player stored in a PC does not have a function of interpreting such a subpath, if copied content is reproduced using the general-purpose program, there is a case where a reproduction mode different from a case where content recorded on a disc is directly reproduced appears.

The information processing apparatus of the present technology performs processes as below in order to solve the problem.

(Step 1)

During the execution of copying content from the first medium to the second medium, the analysis of the playlist file is performed, and it is determined whether or not there is data that is likely to block correct reproduction when a reproduction program other than a dedicated program such as a playlist using the subpath is used.

(Step 2a)

When it is determined that there is data that is likely to block correct reproduction when a reproduction program other than a dedicated program such as a playlist file using the subpath is used, the questionable playlist file is excluded from the copy target.

(Step 2b)

Alternatively, a clip (clip information file and clip AV stream file) designated by a path other than the main path (playitem) of the playlist file is excluded from the copy target.

(Step 2c)

Alternatively, a user is given a warning that correct reproduction is not performed.

At least any process of those steps (2a to 2c) is performed.

Furthermore, a process of determining whether or not the playlist file, the clip information file, or the AV stream file is set to the copy target is performed by analyzing, for example, the playlist or the clip information file recorded on the first medium that is the copy source medium.

Specifically, for example, when a playlist file set with a subpath is included in data to be copied designated by a user, a process in which the playlist file or a clip designated by the subpath is excluded from the copy target is performed.

Furthermore, for example, a process of the above-described (Step 2b) is performed, in other words, the playlist file having the subpath is copied, but the clip information file and the clip AV stream file designated by the subpath of the playlist file are not set to the copy target.

When the process is executed, it may be configured such that an apparatus executing a copy process performs a rewriting process of the playlist file having the information of the subpath, in other words, a playlist file updating process in which the subpath set as designation information of the deleted clip information file, and the updated playlist file is recorded on a copy destination.

If such a process is executed, the copy destination is recorded with the playlist file only constituted by a playitem as the main path, and reproduction by selecting a clip file designated by a playitem as the main path is possible using a general-purpose image reproduction program.

Furthermore, as a specific example of the above-described warning process of (Step 2c), a process of notifying, for example, the execution of a copy process accompanying deletion of content corresponding to the subpath, or the like through a display is performed.

In addition, a configuration may be adopted in which a copy process is started based on consent of a user to the warning (input of a copy start request).

By executing the copy process, the user can recognize that the reproduction of copied content is not reproduced in the same manner as the reproduction of content from, for example, a BD that is the copy source.

[5. Regarding Information Referred for Execution of Copy Control]

Next, in a content copy process by the information processing apparatus of the technology, information referred in order to determine whether or not data that is likely to have a problem when a program other than a dedicated reproduction program is used is included will be described.

As previously described, the information processing apparatus of the technology performs a process of determining whether or not content recorded on the first medium that is a copy source medium, for example, a BD includes data that is likely to be not used in a copy destination.

The information processing apparatus of the technology refers to, for example, the following data for the determination process:

(a) Playlist file; and
(b) Clip information file.

At least any of the two files is referred to.

The information processing apparatus of the technology executes a process of determining whether or not data that blocks correct reproduction during the reproduction of copied data is included, with reference to at least any of the above files in the execution of a copy process.

Hereinbelow, the above-described two files referred to for copy control will be described in order.

(5-1. Regarding Reference Information of Playlist File)

The information processing apparatus of the technology determines whether or not data that is likely to have a problem during the reproduction of copied data is included, with reference to a playlist file when data recorded on the first medium is copied onto the second medium, and when it is determined that such data is included, a process is performed such as excluding the data from the copy target, outputting a warning to a user, updating (reconstruction) of the playlist, or the like.

Specifically, for example, a copy control process in which a playlist file set with a subpath is identified and excluded from the copy target is performed.

Hereinbelow, a specific example of the playlist file and an example of data selected as a target of copy control in the information processing apparatus of the technology will be described.

First, the syntax (data structure) of the playlist file (PlayList( ) will be described with reference to FIGS. 11 and 12. FIG. 11 is a diagram showing the syntax of the playlist file (PlayList( ).

A length is a 32-bit unsigned integer indicating the number of bytes from right after the length field to the end of PlayList ( ) In other words, the length is a field indicating the number of bytes from reserved_for_future_use to the end of PlayList. After the length, 16-bit reserved_for_future_use is prepared.

number_of_PlayItems is a 16-bit field indicating the number of playitems (PlayItem) in the playlist (PlayList). For example, in the examples of FIGS. 9 and 10, the number of playitems (PlayItem) is two. The value of PlayItem_id is allocated from 0 in the order that PlayItem( ) appears in PlayList.

number_of_SubPaths is a 16-bit field indicating the number (the number of entries) of subpaths (SubPaths) in the playlist (PlayList). For example, in the examples of the playlist shown in FIG. 10, the number of subpaths (SubPaths) is one. The value of SubPath_id is allocated from 0 in the order that SubPath( ) appears in PlayList.

FIG. 12 is a diagram showing the syntax of the subpath (SubPath( ) that is one field of the playlist file shown in FIG. 11.

A length is a 32-bit unsigned integer indicating the number of bytes from right after the length field to the end of SubPath ( ). In other words, the length is a field indicating the number of bytes from reserved_for_future_use to the end of SubPath ( ). After the length, 16-bit reserved_for_future_use is prepared.

A subpath type (SubPath_type) is an 8-bit field indicating the type (application type) of the subpath (SubPath). The subpath type indicates a type, for example, whether data (clip) designated by the subpath (SubPath) is audio data, bit-map subtitles, text subtitles, data corresponding to slideshow, data for interactive application, or the like.

As a setting example of the subpath type (SubPath_type) will be described later with reference to FIG. 13.

After the subpath type (SubPath_type), 15-bit reserved_for_future_use is prepared. is_repeat_SubPath is a 1-bit field designating the reproduction method of the SubPath, and indicates whether the reproduction of the SubPath is repeated during the reproduction of the main path, or whether the reproduction of the SubPath is performed only once. For example, it is used when the reproduction times of both the main AV stream and a stream included in a Clip designated by the subpath are different (when the main path is set to a slideshow of still images, and the audio path of the subpath is used as BGM (Background Music) of the main path, or the like).

After is_repeat_SubPath, 8-bit reserved_for_future_use is prepared. number_of_SubPlayItems is an 8-bit field indicating the number (the number of entries) of SubPlayItems in one SubPath.

FIG. 13 is a diagram illustrating one setting example of the subpath type (SubPath_type). The type of a subpath (SubPath) can be defined, for example, as shown in FIG. 13.

In FIG. 13, subpath types 0 and 1 [SubPath_type=0, 1] is set to be under reservation (reserved).

A subpath type 2 [SubPath_type=2] indicates that it is a subpath for audio applied to a browsable slideshow (Audio presentation path of the Browsable slideshow).

For example, by executing reproduction after an image clip applied to the browsable slideshow is designated by the playtime that is the main path in the playlist, and an audio data clip applied to the browsable slideshow is designated by the subpath of the SubPath_type=2, a browsable slideshow is performed in which the reproduction of BGM and consecutive reproduction of still images are executed in parallel.

A subpath type 3 [SubPath_type=3] indicates that it is a subpath for interactive application (Interactive graphics presentation menu).

For example, it is a subpath for executing the display of a menu of interactive graphics for providing information corresponding to the main content, for example, episodes, director's comment, or the like as a pop-up menu (PopUp Menu) together with content such as a movie included in a clip designated by a playitem set as the main path in a playlist.

A subpath type 4 [SubPath_type=4] indicates that it is a subpath for subtitles (Text subtitle presentation path).

For example, by executing reproduction after an image clip storing movie content is designated by the playitem that is the main path in the playlist and a text subtitle clip for the movie content is designated by the subpath of the SubPath_type=4, a reproduction process for displaying subtitles together with the movie is performed.

A subpath type 7 [SubPath_type=7] indicates a path for Picture-in-Picture (In-mux PiP). It is used for displaying images acquired by the subpath in a display area of the playitem as the main path. For example, it is used for displaying images of a preview, an advertisement, an episode, or the like.

Furthermore, the description "In-mux" in (In-mux PiP) indicates that a transport stream (TS) that includes an elementary stream (ES) including reproduction target data in a clip to which a subpath refers is the same as a transport stream (TS) that includes one or more elementary streams (ES) to which a playitem refers as the main path.

In other words, the description indicates that the ES of the clip to which the subpath refers is a type (kind) of a subpath multiplexed in the TS including the reference ES of the main path. In other words, it is a state where the main TS, which is included in the main clip to which the playitem refers as the main path, includes the main clip AV stream and a sub clip AV stream. Hereinbelow, such a type is called a path multiplexed in the TS of the main path.

Subpath types 8 to 255 [SubPath_type=8 to 255] is set to be under reservation (reserved).

Furthermore, a setting example of the subpath type described with reference to FIG. 13 is an example, and setting of various types is possible also for other subpath types shown in FIG. 13. In addition, the correspondence relationship between a number and the content of a subpath type is not limited to the correspondence relationship shown in FIG. 13, and can be set to other correspondence relationship.

There are various types in a subpath set in a playlist file as above, and a browsable slideshow, reproduction with subtitles, execution of an interactive application, or the like is performed by a reproduction process using a playlist file set with a various types of the subpath. However, such a reproduction process is correctly executed when a program dedicated to content is used, but there are many cases where reproduction is not correctly performed when a general-purpose reproduction program without a function of interpreting the subpath is used.

As described above, the information processing apparatus of the technology determines whether or not data that is likely to have a problem when a program other than a reproduction program dedicated to copied content, for example, a playlist file set with a subpath is applied to reproduction, when data recorded on the first medium is copied to the second medium. For example, a copy control process according to the above-described subpath, specifically, a process of excluding the data from the copy target, outputting a warning to a user, updating (reconstruction) of the playlist, or the like is performed.

Furthermore, a specific process example according to, for example, a type of the subpath, or the like will be described later.

In addition, the information processing apparatus of the technology refers not only to the above-described subpath but also to playitem information equivalent to, for example, the main path that is recording information of the playlist file, and performs a process of determining whether interactive graphics (IG) is multiplexed in the playitem as the main path.

The interactive graphics (IG) is image (graphic) information for displaying a button, a menu, or the like for inputting a command or the like by a user on a display image, for example, of a clip selected by a playitem as the main path in an overlapping manner. If the image information (IG) is multiplexed (In-mux) in a transport stream (TS) of the clip selected by the playitem as the main path, in other words, if the information is In-mux IG, when reproduction is performed using a general-purpose moving image reproduction program at a copy destination, there is a high possibility that the reproduction is not performed.

Therefore, when the interactive graphics (IG) [In-mux IG] multiplexed on the main path is included, a process of excluding data such as the playlist, the clip, or the like from the copy target, outputting a warning to a user, updating (reconstruction) of the playlist, or the like is performed.

A specific copy control process based on the determination of the above-described subpath type of the playlist file and of interactive graphics (IG) [In-mux IG] multiplexed on the main path will be described later.

(5-2. Regarding Reference Information of Clip Information File)

A clip information file to which a playlist file refers is recorded with application type information (application_type) as information on the type of reproduction data included in a clip.

The information processing apparatus of the technology determines whether or not data that is likely to have a problem in the reproduction of copied data is included, for example, referring to the clip information file and based on recording information of the clip information file when data recorded on the first medium is copied to the second medium, and when it is determined that the data is included, a process of excluding the data from the copy target, outputting a warning to a user, updating (reconstruction) of the playlist, or the like is performed.

In other words, the information processing apparatus of the technology determines application type information (application_type) recorded in the clip information file to which the playlist file refers, and performs copy control according to the determination information.

An example of the application type information (application_type) set in the clip information file will be described with reference to FIG. 14.

The application type information (application_type) is described in [ClipInfo( )] that is a data item in the clip information file (Clip Information file) for each clip (Clip). However, herein, description of the syntax of ClipInfo( ) is omitted for the sake of convenience of description, and hereinbelow, a setting example of the application type information (application_type) described in the ClipInfo( ) will be described with reference to FIG. 14.

As shown in FIG. 14, for example, types 1 to 7 are defined as the application type information (application_type).

An application type 0 (application_type=0) is set to be under reservation (reserved).

An application type 1 (application_type=1) indicates that it is a clip of the main transport stream (Main TS) for a movie application. Herein, the "Main TS" is a transport stream (Transport stream) having reproduction target data to which a playitem as the main path refers in a playlist (PlayList), that is, a main TS (Main TS).

An application type 2 (application_type=2) indicates that it is a clip of the Main TS for a time-based slideshow (Time-based Slideshow), that is, the Main TS for an image slideshow.

An application type 3 (application_type=3) indicates that it is a TS for a browsable slideshow (Browsable Slideshow), that is a clip of the Main TS for a video slideshow.

An application type 4 (application_type=4) indicates that it is a clip of a TS of a browsable slideshow (Browsable Slideshow) for a subpath (SubPath).

This is given to, for example, the ClipInfo( ) for the Clip AV stream holding BGM (sound) data reproduced in asynchronization with the above-described application_type=3.

An application type 5 (application_type=5) indicates that it is a clip of a TS for interactive graphics of a subpath (SubPath).

An application type 6 (application_type=6) indicates that it is a clip of a TS for text subtitles (text subtitle data) of a subpath (SubPath).

An application type 7 (application_type=7) indicates that it is a clip of a TS for a subpath (SubPath) including one or more ES (elementary streams).

Application types 8 to 255 (application_type=8 to 255) is set to be under reservation (reserved).

Furthermore, the setting example of application types described with reference to FIG. 14 is an example, and setting of various types is possible also for other subpath types shown in FIG. 14. In addition, the correspondence relationship between a number and the content of an application type is not limited to the correspondence relationship shown in FIG. 14, and can be set to other correspondence relationship.

The information processing apparatus of the technology determines whether or not data that is likely to have a problem in the reproduction of copied data is included, for example, referring to application type information of the above-described the clip information file when data recorded on the first medium is copied to the second medium, and when it is determined that the data is included, a process of excluding the data from the copy target, outputting a warning to a user, updating (reconstruction) of the playlist, or the like is performed.

[6. Regarding Specific Example of Copy Control Executed by Information Processing Apparatus of Present Technology]

As previously described, when data recorded on the first medium is copied onto the second medium and a reproduction program other than a reproduction program dedicated to the reproduction of copied content from a copy destination medium is used, the information processing apparatus of the technology determines whether or not data of which correct reproduction is difficult is included, and executes various copy control according to the determination result.

In the determination process, recording information of the playlist file and the clip information file is referred to.

Hereinbelow, as a specific example of a process executed based on the recording information of the playlist file and the clip information file, a process example in the case where data to be copied is the following data will be described, which includes:

(a) Data for browsable slideshow;
(b) Data for interactive application;
(c) Data for text subtitles;
(d) Data for Picture-in-Picture (in-mux PiP); and
(e) Data for interactive graphics (In-mux IG).

(a) Data for Browsable Slideshow

The determination that data to be copied is data for a browsable slideshow is executed based on any of the following setting information, which includes the subpath type (SubPath_type=2) of the playlist file, or the application types 3 and 4 of the clip information file (application_type=3 and 4).

For example, when the setting of the clip information file or the playlist file included in data to be copied selected by a user is the above setting, and it is found that the data is data for a browsable slideshow, at least any of the following processes is performed.

(1) The data is excluded from a list as data to be copied provided to a user, and excluded from the copy target.

(2) A warning display on attention (notification of a possibility that the data may not be normally reproduced after copying) to user is performed.

(3) During the execution of a copy process, a user is made to select the execution of bit-by-bit (Bit by Bit) copying without data conversion (transcoding) or the execution of copying accompanying data conversion (Transcode Managed Copy), and when the copying accompanying data conversion (Transcode Managed Copy) is selected, data that is likely to have a reproduction error is deleted in a data conversion unit (transcoder).

Furthermore, according to the execution of the data deletion, the playlist file and the clip information file (EP map or the like) are updated.

(b) Data for Interactive Application

The determination that data to be copied is data for interactive application is executed based on any of the following setting information, which includes the subpath type (SubPath_type=3) of the playlist file, or the application type 5 (application_type=5) of the clip information file.

For example, when the setting of the clip information file or the playlist file included in data to be copied selected by a user is the above setting, and it is found that the data is data for interactive application, for example, a popup menu (PopUp Menu), at least any of the following processes is performed.

(1) The data is excluded from a list as data to be copied provided to a user, and excluded from the copy target.

(2) A warning display on attention (notification of a possibility that the data may not be normally reproduced after copying) to user is performed.

(3) During the execution of a copy process, a user is made to select the execution of bit-by-bit (Bit by Bit) copying without data conversion (transcoding) or the execution of copying accompanying data conversion (Transcode Managed Copy), and when the copying accompanying data conversion (Transcode Managed Copy) is selected, data that is likely to have a reproduction error (for example, the popup menu (PopUp Menu)) is deleted in the data conversion unit (transcoder).

Furthermore, according to the execution of the data deletion, the playlist file and the clip information file (EP map or the like) are updated.

(c) Data for Text Subtitles

The determination that data to be copied is data for text subtitles is executed based on any of the following setting information, which includes the subpath type 4 (SubPath_type=4) of the playlist file, or the application type 6 (application_type=6) of the clip information file.

For example, when the setting of the clip information file or the playlist file included in data to be copied selected by a user is the above setting, and it is found that the data is data for text subtitles, at least any of the following processes is performed.

(1) The data is excluded from a list as data to be copied provided to a user, and excluded from the copy target.

(2) A warning display on attention (notification of a possibility that the data may not be normally reproduced after copying) to user is performed.

(3) During the execution of a copy process, a user is made to select the execution of bit-by-bit (Bit by Bit) copying without data conversion (transcoding) or the execution of copying accompanying data conversion (Transcode Managed Copy), and when the copying accompanying data conversion (Transcode Managed Copy) is selected, data that is likely to have a reproduction error (data for text subtitles) is deleted in the data conversion unit (transcoder).

Furthermore, according to the execution of the data deletion, the playlist file and the clip information file (EP map or the like) are updated.

(d) Data for Picture-in-Picture (In-mux PiP)

The determination that data to be copied is data for Picture-in-Picture (In-mux PiP) is executed based on setting information of the subpath type 7 (SubPath_type=7) of the playlist file.

For example, when the setting of the playlist file included in data to be copied selected by a user is the above setting, and it is found that the data is data for Picture-in-Picture (In-mux PiP), at least any of the following processes is performed.

(1) The data is excluded from a list as data to be copied provided to a user, and excluded from the copy target.

(2) A warning display on attention (notification of a possibility that the data may not be normally reproduced after copying) to user is performed.

(3) During the execution of a copy process, a user is made to select the execution of bit-by-bit (Bit by Bit) copying without data conversion (transcoding) or the execution of copying accompanying data conversion (Transcode Managed Copy), and when the copying accompanying data conversion (Transcode Managed Copy) is selected, data that is likely to have a reproduction error (secondary video (Secondary Video) and secondary audio (Secondary Audio) that is the data for Picture-in-Picture (In-mux PiP)) is deleted in the data conversion unit (transcoder).

Furthermore, according to the execution of the data deletion, the playlist file and the clip information file (EP map or the like) are updated.

(e) Data for Interactive Graphics (In-mux IG)

The determination that data to be copied is data for interactive graphics (In-mux IG) is executed based on playitem information that is the main path information of the playlist file.

For example, when the setting of the playlist file included in data to be copied selected by a user is recorded with the fact that the data for interactive graphics (In-mux IG) is included, at least any of the following processes is performed.

(1) The data is excluded from a list as data to be copied provided to a user, and excluded from the copy target.

(2) A warning display on attention (notification of a possibility that the data may not be normally reproduced after copying) to user is performed.

(3) During the execution of a copy process, a user is made to select the execution of bit-by-bit (Bit by Bit) copying without data conversion (transcoding) or the execution of copying accompanying data conversion (Transcode Managed Copy), and when the copying accompanying data conversion (Transcode Managed Copy) is selected, data that is likely to have a reproduction error (data for interactive graphics (In-mux IG)) is deleted in the data conversion unit (transcoder).

Furthermore, according to the execution of the data deletion, the playlist file and the clip information file (EP map or the like) are updated.

[7. Regarding Sequence of Copy Process Executed by Information Processing Apparatus of Present Technology]

Next, the sequence of the copy process executed by the information processing apparatus of the technology will be described with reference to the flowchart shown in FIG. 15 and succeeding drawings.

A process of each step of Step S101 and succeeding steps of the flow shown in FIG. 15 will be described.

First, in Step S101, a copy processing program stored in the information processing apparatus in advance is started.

Furthermore, the copy process is performed as the managed copy (MC) process executed under the management of the server previously described with reference to FIG. 4.

In Step S102, copiable content recorded on the first medium that stores copy source content is displayed to a user. The display process is performed using a display unit (display) of the information processing apparatus.

The process is equivalent to a process of displaying a list of copy permitted content (copy permission list 121) on the display unit of the information processing apparatus with application of the response information (Offer Response) 131 from the management server 140 previously described with reference to FIGS. 4 and 7. The list is set with, for example, a fee (price) for copying each piece of content.

In Step S103, content to be the copy target is selected from the displayed list.

In Step S104, the playlist file included in the data to be copied selected by the user is analyzed. Furthermore, when there is a plurality of playlist files included in the data to be copied, the process of Step S104 and succeeding steps is executed for each of the playlist files in order.

In Step S105, it is determined whether or not a playlist file selected to be analyzed includes interactive graphics (IG) data multiplexed either on the subpath or the main path.

When it is determined that either one is included, the process advances to Step S111.

When it is determined that any of the data is not included, the process advances to Step S106, each of a playlist file (PlayList) to be copied, a clip information file (ClipInfo) designated from the selected playlist, and a clip AV stream file (m2ts) is read from the first medium according to the playlist file name described in the response information (Offer Response) received from the server (refer to FIG. 7), and copied and recorded on the second medium.

Furthermore, the copy and recording process may be any of a bit-by-bit (Bit by Bit) copying, which copies data recorded on the first medium without change, or a copy process accompanying data conversion (transcoding).

Furthermore, the data copied onto the second medium in Step S105 does not include any of the interactive graphics (IG) data multiplexed on the subpath or the main path. Specifically, the data is content of which reproduction is executed using the playlist constituted only by the playitem as an extremely simple main path previously described with reference to FIG. 9, when the general-purpose reproduction program is used, not using a dedicated reproduction program for the content, the main content for the main path is reproduced without problems.

Figure 16:
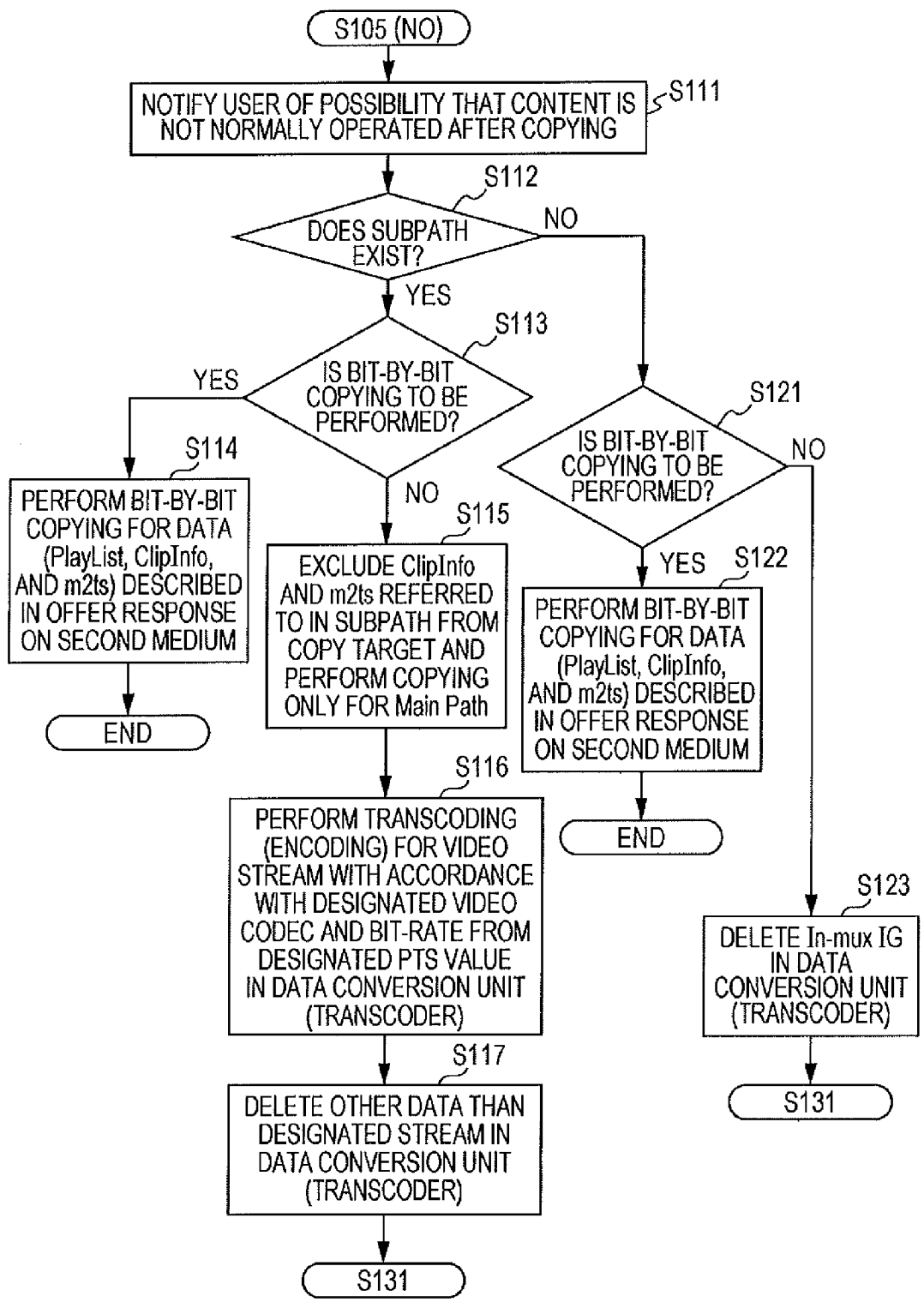
FIG. 16 is a diagram showing a flowchart describing the sequence of the copy process sequence executed by the information processing apparatus of the technology.

On the other hand, in Step S105, when it is determined that the playlist file selected to be analyzed includes any of the interactive graphics (IG) data multiplexed either on the subpath or the main path, the process advances to Step S111 shown in FIG. 16.

In Step S111, a process of notifying the user that the copied content is likely to be not normally reproduced is executed. The notification process is performed by a process of displaying, for example, a warning message on the display unit of the information processing apparatus.

Next in Step S112, it is determined whether or not the subpath exists in the playlist. If the subpath exists in the playlist, the process advances to Step S113.

In Step S113, it is determined whether the bit-by-bit (Bit by Bit) copying for copying the data recorded on the first medium without change is to be executed, or a copy process accompanying data conversion (transcoding) is to be executed.

The determination process may be configured to execute any process stipulated in a device executing the copy process, or to make a user select by giving an inquiry to the user.

When the data recorded on the first medium is subjected to the bit-by-bit (Bit by Bit) copying without change, the process advances to Step S114.

In Step S114, each of a playlist file (PlayList) to be copied, a clip information file (ClipInfo) designated from the selected playlist, and a clip AV stream file (m2ts) is read from the first medium according to the playlist file name described in the response information (Offer Response) received from the server (refer to FIG. 7), and the bit-by-bit (Bit by Bit) copying process is performed without data conversion for the second medium.

Furthermore, the data copied from the first medium to the second medium in Step S114 is the same data recorded on the first medium.

In other words, a subpath is set in the playlist, and data corresponding to the subpath (clip) also is copied without change.

Thus, even when the copied content is reproduced using the general-purpose moving image reproduction program other than a reproduction program dedicated to the content, there is a possibility that correct reproduction is not performed without the interpretation of the subpath. However, since the information has already been notified to the user in Step S111, a possibility that the user renders a mistaken judgment that something is out of order can be reduced.

On the other hand, in Step S113, when the data recorded on the first medium is subjected to the copy process accompanying data conversion (transcoding), the process advances to Step S115.

In Step S115, the clip information file (ClipInfo) designated by the subpath included in the playlist and the clip AV stream file (m2ts) is excluded from the copy target, and with regard to a clip, only the clip designated by the main path of the playlist (the clip information file (ClipInfo) and the clip AV stream file (m2ts)) is selected as the copy target.

Furthermore, as selection information of the data to be copied, a PTS (Presentation Time Stamp) as data location information of a clip is used.

Next, in Step S116, the data conversion unit (transcoder) specifies the data to be copied based on a value of a PTS indicating copy target location information of a clip, and executes data conversion (transcoding) of a video stream in accordance with a bit-rate and a video codec designated according to the copy destination medium in advance.

Next, in Step S117, data other than the designated stream, specifically, data corresponding to the subpath, or the like is deleted in the data conversion unit (transcoder). After the processes, the process advances to Step S131.

On the other hand, in the determination process of Step S112, when it is determined that the subpath does not exist, the process advances to Step S121.

Furthermore, the playlist file that is already the processing target in Step S105 is determined to include the interactive graphics (In-mux IG) multiplexed in the TS of the subpath or the main path, and the playlist that is determined to not include a subpath in the determination process of Step S112 includes the interactive graphics (In-mux IG) multiplexed in the TS of the main path.

In this case, in Step S121, it is determined whether the bit-by-bit (Bit by Bit) copying for copying the data recorded on the first medium without change is to be executed, or a copy process accompanying data conversion (transcoding) is to be executed.

The determination process may be configured to execute any process stipulated in a device executing the copy process, or to make a user select by giving an inquiry to the user.

When the data recorded on the first medium is subjected to the bit-by-bit (Bit by Bit) copying without change, the process advances to Step S122.

In Step S122, each of a playlist file (PlayList) to be copied, a clip information file (ClipInfo) designated from the selected playlist, and a clip AV stream file (m2ts) is read from the first medium according to the playlist file name described in the response information (Offer Response) received from the server (refer to FIG. 7), and the bit-by-bit (Bit by Bit) copying process is performed without data conversion for the second medium.

Furthermore, the data copied from the first medium to the second medium in Step S122 is the same data recorded on the first medium.

In other words, the data is obtained such that interactive graphics (In-mux IG) data is multiplexed in the TS (transport stream) of the clip designated by the main path included in the playlist.

Thus, even when the copied content is reproduced using the general-purpose moving image reproduction program other than a reproduction program dedicated to the content, there is possibility that correct reproduction is not performed without the interpretation of the multiplexed IG (In-mux IG). However, since the information has already been notified to the user in Step S111, a possibility that the user renders a mistaken judgment that something is out of order can be reduced.

On the other hand, in Step S121, when the data recorded on the first medium is subjected to the copy process accompanying data conversion (transcoding), the process advances to Step S123.

In Step S123, the interactive graphics (In-mux IG) data multiplexed in the TS (transport stream) of the clip designated by the main path included in the playlist is deleted in the data conversion unit (transcoder). After the processes, the process advances to Step S131.

The process of Step S131 and succeeding steps will be described with reference to FIG. 17.

In Step S131, a re-composition process (multiplexing process or the like) of the clip AV stream constituted only by data to be copied except for the deleted data is executed.

In other words, the AV stream constituted only by data selected as a copy target is re-set.

In Step S132, resetting of a GOP as encoding/decoding unit of MPEG, resetting of a source packet number (SPN), or the like is executed. The source packet number (SPN) is a number from the leading part of the packet in the clip AV stream.

Next, in Step S133, an updating process of the playlist file and the clip information file is executed based on data after the re-composition process (multiplexing process or the like) of the clip AV stream.

The detailed sequence of the updating process of the playlist file and the clip information file will be described with reference to the flowchart shown in FIG. 18.

In Step S151, the source packet number (SPN) of the leading I-picture of the GOP is calculated based on data after the re-composition process (multiplexing process or the like) of the clip AV stream.

In Step S152, the calculated leading source packet number (SPN) of the GOP is recorded in an EP map (EP_map).

Figure 19:
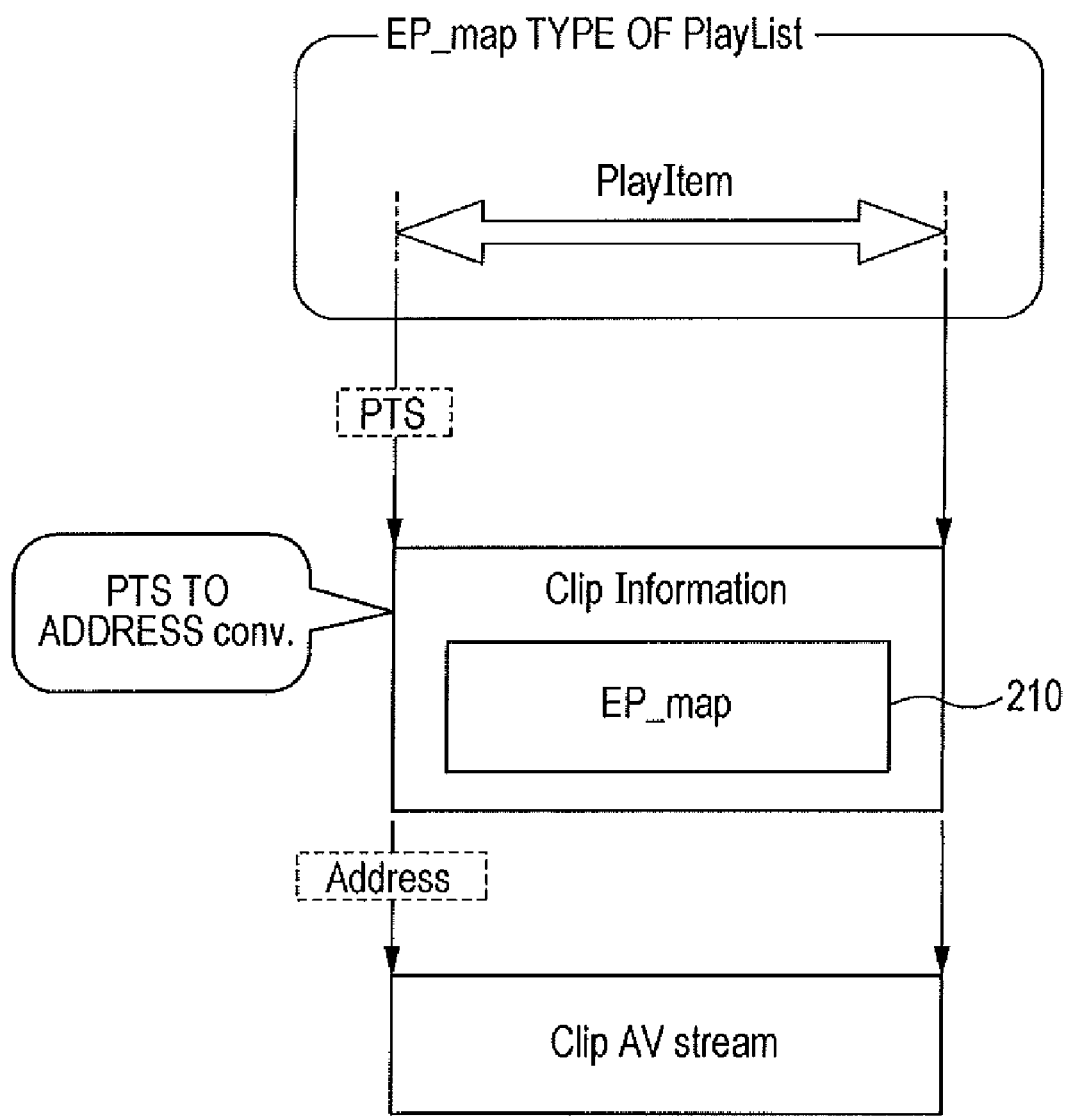
FIG. 19 is a diagram illustrating an EP map.

The EP map will be described with reference to FIGS. 19 and 20A to 20D. As shown in FIG. 19, the EP map (EP_map) 210 is data included in the clip information file. The EP map has detection information of an I-picture location as reference data of MPEG data that is, for example, a point (entry point) from which random access is started. A detection process of the I-picture location will be described with reference to FIGS. 20A to 20D. FIG. 20A shows the clip AV stream, and each rectangle indicates a 192-byte source packet. Each source packet is stipulated with a reproduction processing time set with a time stamp.

FIG. 20B shows a detailed configuration of a source packet number (X1). One source packet is constituted by a TP_extra header and a transport packet, and the transport packet is constituted by various header information, and data of I-PIC H and subsequent data as substance of MPEG data.

The clip information file shown in FIG. 20C includes the above-described EP map.

The EP map includes each data of [PTS_EP_start], [SPN_EP_start], and [I_end_position_offset] as shown in the drawing.

The meaning of each data is as follows.

PTS_EP_start: A time stamp (Presentation Time Stamp) corresponding to a source packet including a sequence header.

SPN_EP_start: A leading address of a source packet including a sequence header.

I_end_position_offset: Offset from a source packet including a sequence header to a source packet including the end of an I-picture.

Such data relationship is shown in FIG. 20D.

In other words, the composition of the data included in the source packet is stipulated as shown in FIG. 20B, and the I-picture location in the source packet can be obtained based on each data of [PTS_EP_start], [SPN_EP_start], and [I_end_ position_offset] as shown in FIG. 20C, by obtaining the data from the EP map. A reproduction device can execute a reproduction process from an SPN location registered in the EP map by obtaining the location of the I-picture from the EP map.

In Step S151, the source packet number (SPN) of the leading I-picture of a GOP to be recorded in the EP map can be calculated based on data after the re-composition process (multiplexing process or the like) of the clip AV stream.

In Step S152, the calculated source packet number (SPN) is recorded in the EP map.

Furthermore, in Step S153, the playlist file and the clip information file are updated so as to correspond to the change of the stream deleted in the data conversion (transcoding).

An example of the updating process of the playlist file and the clip information file will be described with reference to FIGS. 21 and 22.

FIG. 21 is a diagram showing an example of a playlist file updating process.

Figure 22:
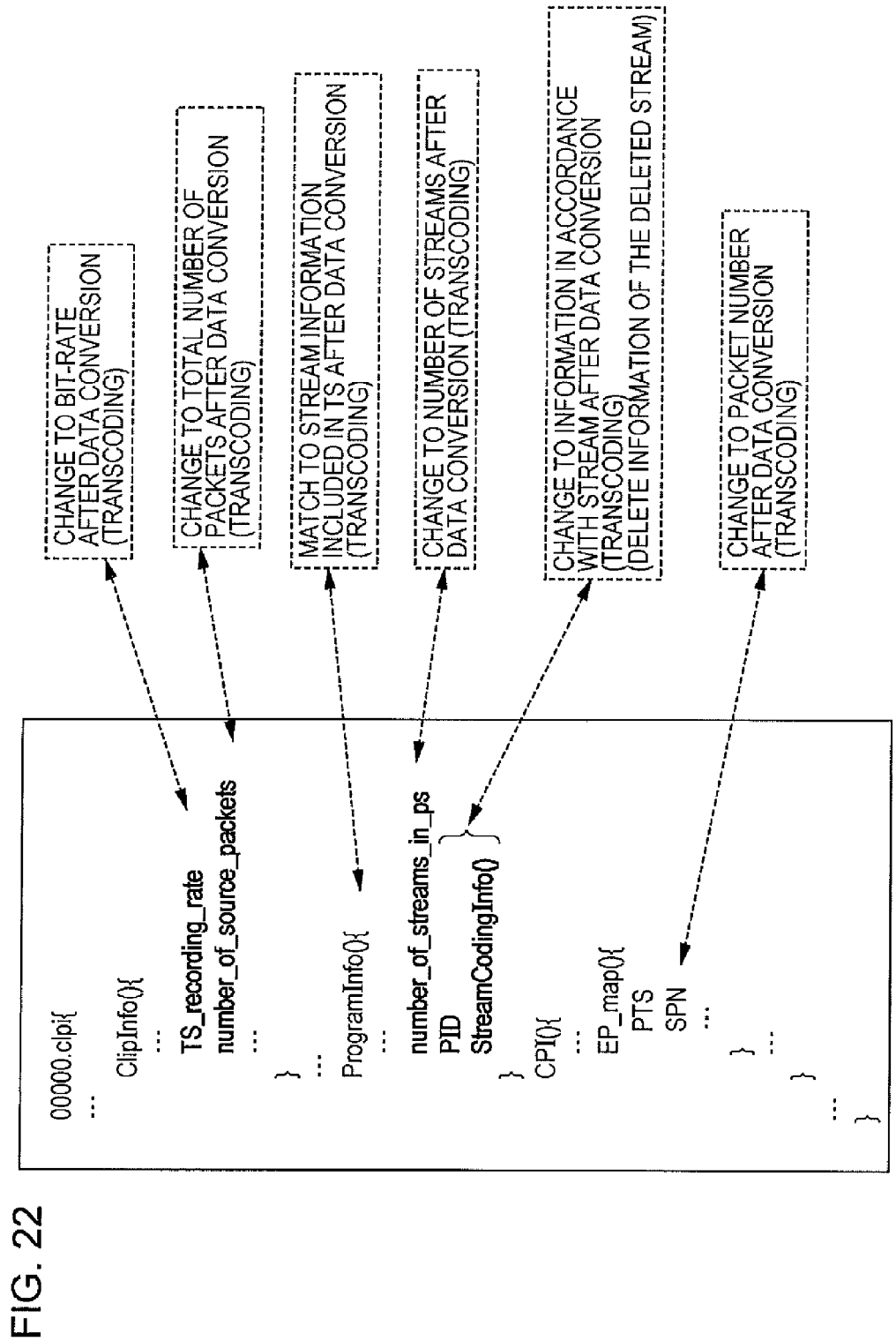
FIG. 22 is a diagram showing an example of a clip information file updating process.

FIG. 22 is a diagram showing an example of a clip information file updating process.

First, the example of the playlist file updating process will be described with reference to FIG. 21.

The example shown in FIG. 21 is an example of deleting subpath information (SubPath( )) set in the playlist file.

When the playlist file recorded on the first medium as the copy source ((1) playlist before updating shown in FIG. 21) is copied onto the second medium and there is the clip AV stream corresponding to the deleted subpath, the subpath information (SubPath( )) used as designation information of the deleted clip AV stream is deleted.

With the deletion process, (2) playlist after updating shown in FIG. 21 is created. The updated playlist file is recorded onto the second medium as the copy destination.

FIG. 22 is a diagram showing an example of a clip information file updating process. The clip information file is a file recorded with reproduction information corresponding to the clip AV stream that is reproduction target data, or the like, and a process is performed to change the data into recorded data according to clip AV stream data after a data deletion process and a conversion process.

Specifically, the data change is performed as shown in FIG. 22. In other words:

TS_recording_rate: To change to bit-rate after data conversion (transcoding);

number_of_source_packets: To change to the total number of packets after data conversion (transcoding);

ProgramInfo( ): To perform a change process in accordance with stream information included in the transport stream (TS) after data conversion (transcoding);

number_of_stream_in_ps: To change to the number of streams after data conversion (transcoding);

PID and StreamCodingInfo( ): To change to information according to the stream after data conversion (transcoding) and to delete information of the deleted stream; and SPN of EP map: To change to a packet number after data conversion (transcoding).

The clip information file updating process accompanied by those change processes is executed.

Figure 18:
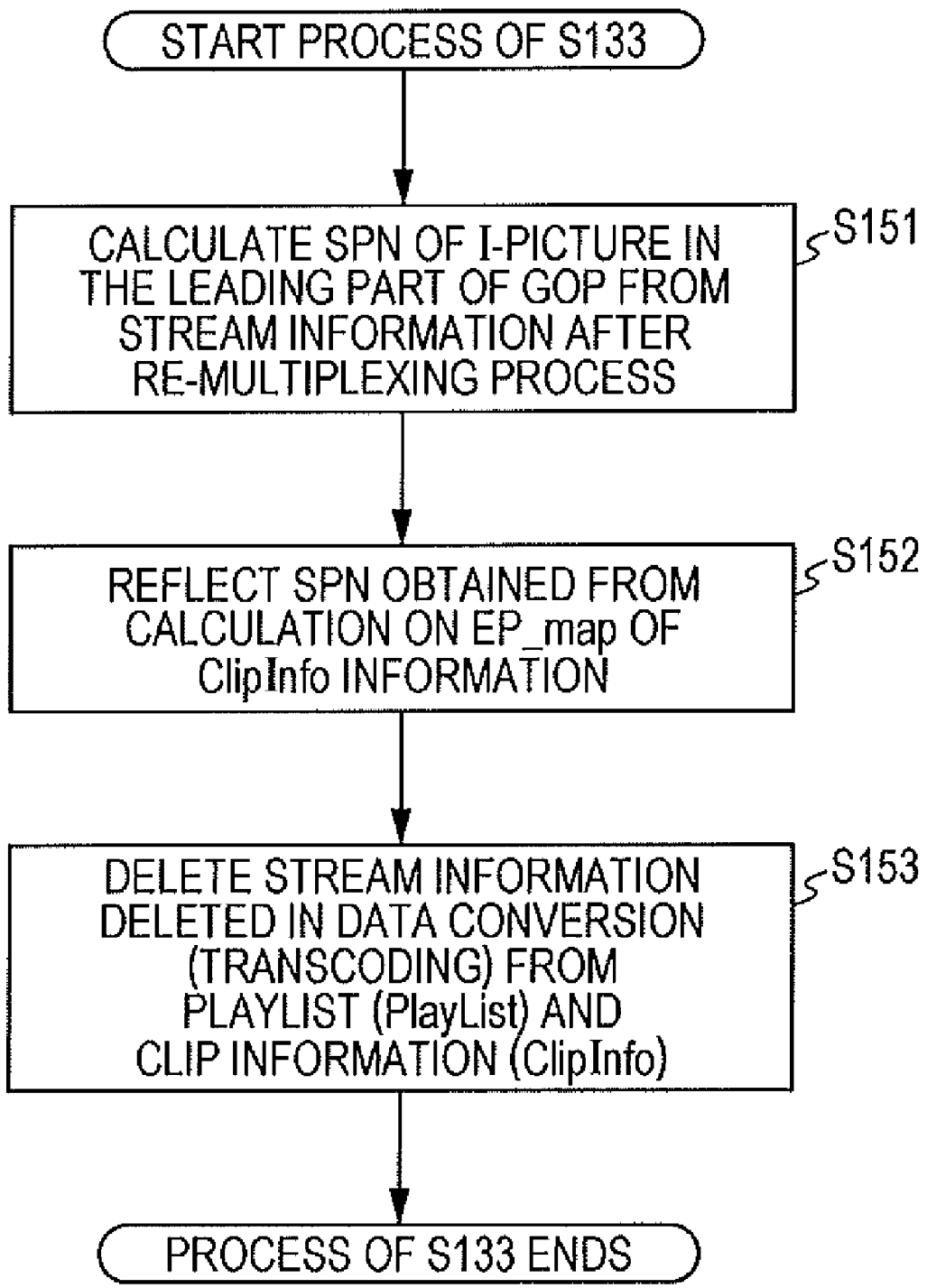
FIG. 18 is a diagram showing a flowchart describing the sequence of the copy process executed by the information processing apparatus of the technology.

The process is performed as a process of Step S153 of the flow shown in FIG. 18, that is, an updating process of the playlist file and the clip information file.

With the updating process, a playlist file and a clip information file coinciding with the content of the AV stream file copied and recorded onto the second medium are created.

Figure 17:
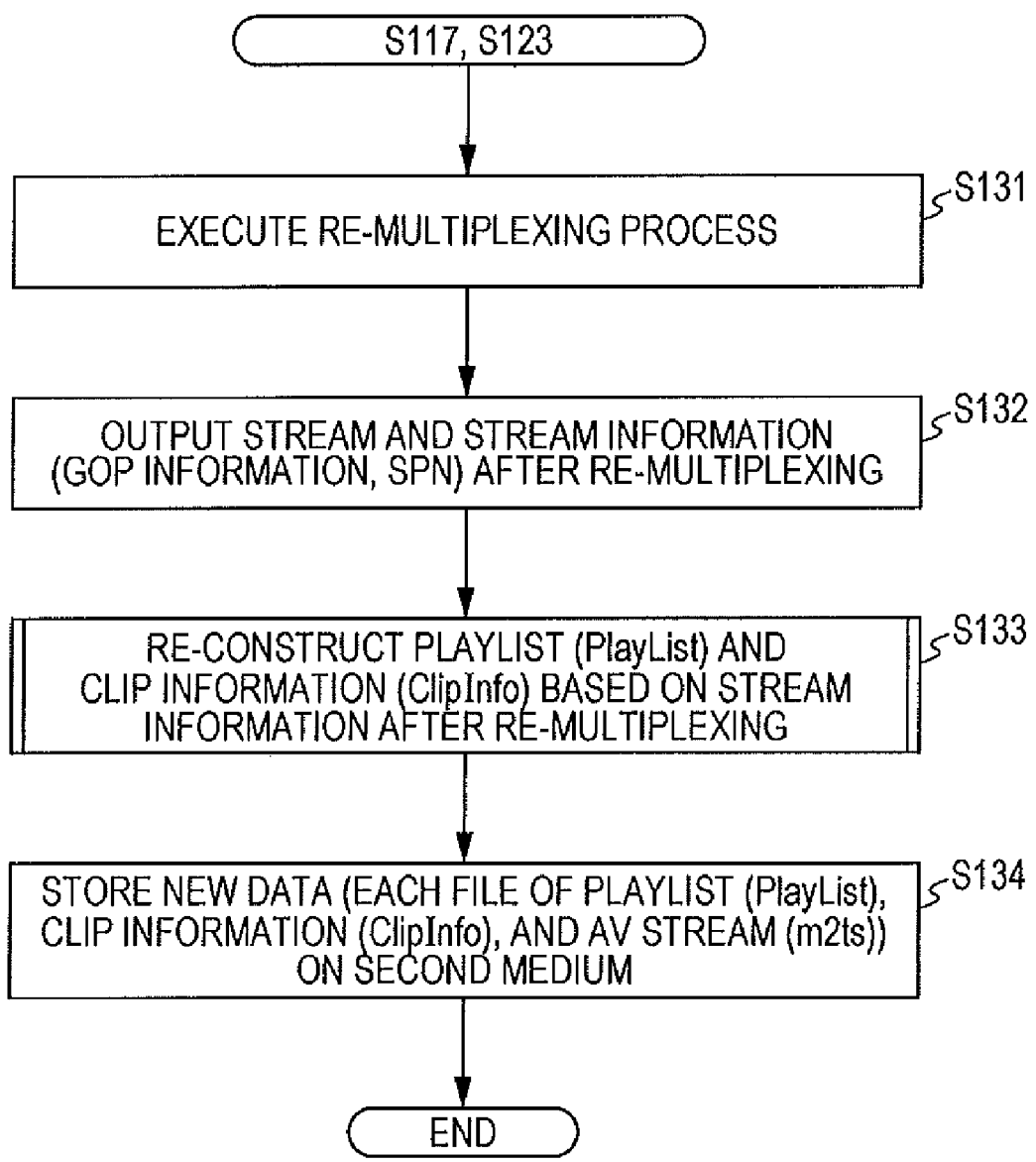
FIG. 17 is a diagram showing a flowchart describing the sequence of the copy process executed by the information processing apparatus of the technology.

The above process is executed as a process of Step S133 shown in FIG. 17, and after the completion of the process, a process of Step S134 shown in FIG. 17 is executed.

In Step S134, the following data is recorded on the second medium that is the copy destination medium, which includes:

updated playlist file (PlayList);

updated clip information file (ClipInfo); and clip AV stream data (m2ts) in which data corresponding to the subpath and data of In-mux IG is deleted.

The data recorded on the second medium with the above process becomes data in a different form from the data recorded on the first medium, but becomes data that can be reproduced without any problem, for example, even in a reproduction process using the general-purpose moving image reproduction program, not using a reproduction program dedicated to the content recorded on the first medium that is the copy source.

In addition, the playlist file and the clip information file is recorded as reproduction control information updated without inconsistency corresponding to the clip AV stream file in which the data corresponding to the subpath and data of In-mux IG is deleted, and a reproduction process without errors can be performed with application of the reproduction control information by the general-purpose reproduction program.

[8. Regarding Configuration Example of Information Processing Apparatus]

Finally, a configuration example of the information processing apparatus 120 according to an embodiment of the present technology will be described with reference to FIG. 23. The information processing apparatus 120 is configured to load the first medium 110 that is a recording medium of copy source content and the second medium 150 as a copy destination of the content therein. Furthermore, it is not necessary to be able to load only two media, but a copy destination medium may be configured to be loaded in another apparatus connected via a USB cable, wireless communication, or the like to output copied data.

As the first medium 110 and the second medium 150, various media (information recording media) including, for example, Blu-ray discs (registered trademark), DVDs, hard disks, flash memories, and the like can be used.

Figure 23:
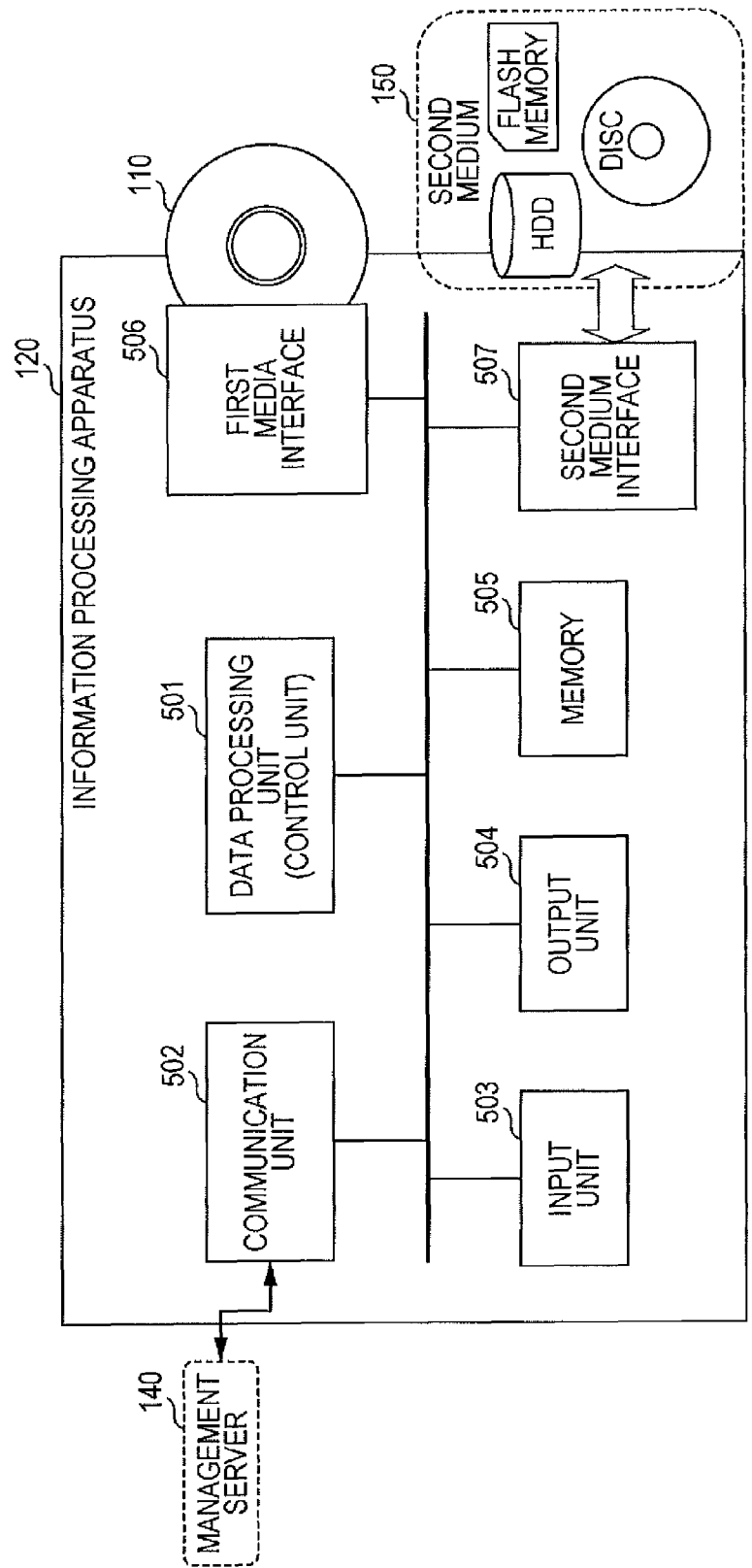
FIG. 23 is a diagram illustrating a configuration example of an embodiment of the information processing apparatus.

The information processing apparatus 120 includes a data processing unit (control unit) 501, a communication unit 502, an input unit 503, an output unit 504, a memory 505, a first media interface 506, and a second media interface 507 as shown in FIG. 23.

The data processing unit 501 is constituted by a CPU having a program execution function for executing a processing program for various data, or the like. For example, in addition to a data recording and reproduction process, various processes accompanying a copy process according to the above-described flowcharts are executed. Furthermore, the data processing unit controls general processes executed by the apparatus including a communication process between the management server 140 via the communication unit 102.

The communication unit 502 is used in a communication process between the management server 140 to perform request and reception of server response information (Offer Response) described above, and further used in a payment process, a reception process of copy permission information (Permission), or the like.

The input unit 503 is an operation unit of a user, for example, and performs various inputs including an input of data recording or reproduction instruction, an input of copying instruction, or the like. Furthermore, a remote controller is included in the input unit 503, and information of remote controller operation can also be input. The output unit 504 is an output part of audio and images, which includes a display, a speaker or the like. The memory 505 includes a RAM, a ROM, or the like, and is used as a storage area for a program executed in the data processing unit 501, various parameters, and received data, or the like, and further used also as a buffer area of copied data.

The first media interface 506 is an interface applied to data recording, reproduction, and a copy process using the first medium 110. The first media interface performs processes of data writing, data reading, data copying or the like using the first medium 110 according to requests from the data processing unit 501.

The second media interface 507 is an interface applied to data recording, reproduction, and a copy process using the second medium 150. The second media interface performs processes of data writing, data reading, data copying or the like using the second medium 150 according to requests from the data processing unit 501.

Hereinabove, the present technology has been discussed with reference to a specific embodiment. However, it is clear that a person skilled in the art can accomplish modification or substitution of the embodiment without departing from the gist of the technology. In other words, the technology is disclosed in a form for exemplification, and is not supposed to be interpreted in a limited manner. In order to determine the gist of the technology, the claims for the technology should to be taken into consideration.

In addition, the series of processes described in the present specification can be executed in hardware, software, or a combined configuration of both. In the case of executing a process in software, a program recorded with a process sequence can be executed after being installed in a memory of a computer which has dedicated hardware incorporated, or can be executed by installing a program on a general-purpose computer that can execute various processes. For example, the program can be recorded on a recording medium in advance. In addition to the installation of the program in a computer from a recording medium, the program can be received via a network such as a LAN (Local Area Network), or the Internet, and can be installed on a recording medium such as a hard disk, or the like, built therein.

Furthermore, various processes described in the present specification are executed not only in a time series according to the description but also in parallel or individually according to the processing capability of a device used to execute the processes or to necessity. In addition, the system in the present specification employs a logically aggregated configuration of a plurality of devices, and the devices of each configuration are not in the same housing at all times.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
 a data processing unit which executes a copy process for recording data recorded on a first medium onto a second medium,
 wherein the data processing unit executes a questionable data discrimination process for discriminating questionable data which is highly likely to be not normally reproduced in a reproduction process in which a reproduction program different from a dedicated reproduction program to the data recorded on the first medium is applied, and executes at least any of processes, which include a questionable data deletion process for deleting the questionable data from a copy target or a warning notification process for notifying a user of a possibility that copied data will not be normally reproduced, according to the discrimination result in the questionable data discrimination process, and
 wherein the data processing unit executes the questionable data discrimination process with reference to a file recording reproduction control information recorded on the first medium.

2. The information processing apparatus according to claim 1, wherein the data processing unit discriminates whether or not a playlist file includes a subpath that is reproduction designation information of sub data in addition to a playitem that is reproduction designation information of main data with reference to the playlist file recorded on the first medium, and performs a process of discriminating reproduction data using the subpath as the questionable data.

3. The information processing apparatus according to claim 1, wherein the data processing unit discriminates whether or not a playlist file includes a subpath that is reproduction designation information of sub data in addition to a playitem that is reproduction designation information of main data with reference to the playlist file recorded on the first medium, and executes a discrimination process of the questionable data according to subpath type information set in the playlist file.

4. The information processing apparatus according to claim 3, wherein, when the subpath type indicates that a subpath of a type is used at least any data reproduction of a browsable slideshow, an interactive application, text subtitles, and Picture-in-Picture, the data processing unit performs a process of determining that reproduction data using the subpath is questionable data.

5. The information processing apparatus according to claim 1, wherein the data processing unit discriminates that data reproduced according to a playitem that is reproduction designation information of main data set in a playlist file includes a stream resulted from multiplexing interactive graphics data with reference to the playlist file recorded on the first medium, and performs a process of determining that the data is questionable data when the data is discriminated to include the stream.

6. The information processing apparatus according to claim 1, wherein the data processing unit refers to a clip information file recorded on the first medium, and executes a discrimination process of questionable data according to application type information recorded in the clip information file.

7. An information processing apparatus comprising:
 a data processing unit which executes a copy process for recording data recorded on a first medium onto a second medium,
 wherein the data processing unit executes a questionable data discrimination process for discriminating questionable data which is highly likely to be not normally reproduced in a reproduction process in which a reproduction program different from a dedicated reproduction program to the data recorded on the first medium is applied, and executes at least any of processes, which include a questionable data deletion process for deleting the questionable data from a copy target or a warning notification process for notifying a user of a possibility that copied data will not be normally reproduced, according to the discrimination result in the questionable data discrimination process, and
 wherein, when a deletion process of the questionable data from the copy target is executed, the data processing unit executes an updating process of the file recording the reproduction control information recorded on the second medium, together with the deletion process.

8. The information processing apparatus according to claim 7, wherein, when the deletion process of the questionable data from the copy target is executed, the data processing unit executes a playlist file updating process in which the playlist file is set to a file having reproduction control information corresponding to non-deletion data, together with the deletion process.

9. The information processing apparatus according to claim 7, wherein, when the deletion process of the questionable data from the copy target is executed, the data processing unit executes a clip information file updating process in which a clip information file is set to a file having reproduction control information corresponding to non-deletion data, together with the deletion process.

10. The information processing apparatus according to claim 9, wherein, when the deletion process of the questionable data from the copy target is executed, the data processing unit executes an EP map updating process in which an EP map included in the clip information file is set to an EP map constituted by packet information corresponding to non-deletion data, together with the deletion process.

11. The information processing apparatus according to claim 1, further comprising:
 a communication unit which executes communication between a management server,
 wherein the data processing unit displays a list of copy permitted data included in the data recorded on the first medium based on received information from the management server, and selects data to be copied based on a user designation for the display information.

12. An information processing method executed by an information processing apparatus, comprising:
 data-processing by a data processing unit to execute a copy process for recording data recorded on a first medium onto a second medium,
 wherein the data processing includes executing a questionable data discrimination process for discriminating questionable data which is highly likely to be not normally reproduced in a reproduction process in which a reproduction program different from a dedicated reproduction program to the data recorded on the first medium is applied, and executing at least any of processes, which include a questionable data deletion process for deleting the questionable data from a copy target or a warning notification process for notifying a user of a possibility that copied data will not be normally reproduced, according to the discrimination result in the questionable data discrimination process, and wherein the data processing executes the questionable data discrimination process with reference to a file recording reproduction control information recorded on the first medium.

13. A program executed by an information processing apparatus for processing information, comprising:

data-processing in a data processing unit to execute a copy process for recording data recorded on a first medium onto a second medium, wherein the data processing includes causing execution of a questionable data discrimination process for discriminating questionable data which is highly likely to be not normally reproduced in a reproduction process in which a reproduction program different from a dedicated reproduction program to the data recorded on the first medium is applied, and to execute at least any of processes, which include a questionable data deletion process for deleting the questionable data from a copy target or a warning notification process for notifying a user of a possibility that copied data will not be normally reproduced, according to the discrimination result in the questionable data discrimination process, and wherein the data processing executes the questionable data discrimination process with reference to a file recording reproduction control information recorded on the first medium.

* * * * *